(12) United States Patent
Choi et al.

(10) Patent No.: US 10,733,056 B2
(45) Date of Patent: Aug. 4, 2020

(54) DATA PROCESSING SYSTEM FOR SECURING ATOMICITY OF TRANSACTIONS WITHOUT GENERATING SEPARATE COMMIT COMMAND, AND OPERATING METHOD THEREOF

(71) Applicant: SK hynix Inc., Gyeonggi-do (KR)

(72) Inventors: Hae-Gi Choi, Gyeonggi-do (KR); Kyeong-Rho Kim, Gyeonggi-do (KR); Su-Chang Kim, Gyeonggi-do (KR); Sung-Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 127 days.

(21) Appl. No.: 16/000,451

(22) Filed: Jun. 5, 2018

(65) Prior Publication Data

US 2019/0121701 A1   Apr. 25, 2019

(30) Foreign Application Priority Data

Oct. 25, 2017   (KR) .................. 10-2017-0139422

(51) Int. Cl.
| | |
|---|---|
| G06F 11/14 | (2006.01) |
| G06F 3/06 | (2006.01) |
| G06F 12/02 | (2006.01) |
| G06F 11/10 | (2006.01) |
| G06F 11/16 | (2006.01) |

(52) U.S. Cl.
CPC ........ *G06F 11/1446* (2013.01); *G06F 3/0619* (2013.01); *G06F 3/0656* (2013.01); *G06F 3/0659* (2013.01); *G06F 3/0673* (2013.01); *G06F 3/0679* (2013.01); *G06F 11/1048* (2013.01); *G06F 12/0246* (2013.01); *G06F 11/1474* (2013.01); *G06F 11/1666* (2013.01)

(58) Field of Classification Search
CPC .... G06F 3/0619; G06F 3/0656; G06F 3/0659; G06F 3/0673; G06F 3/0679; G06F 11/1048; G06F 11/1446; G06F 11/1474; G06F 11/1666; G06F 12/0246
See application file for complete search history.

(56) References Cited

U.S. PATENT DOCUMENTS

| | | | |
|---|---|---|---|
| 10,191,851 B2 * | 1/2019 | Shu ................... | G06F 3/0679 |
| 2017/0046268 A1 * | 2/2017 | Ummadi ............. | G06F 3/0619 |

FOREIGN PATENT DOCUMENTS

| | | |
|---|---|---|
| KR | 1020130036851 | 4/2013 |
| KR | 1020150003689 | 1/2015 |

* cited by examiner

*Primary Examiner* — Aracelis Ruiz
(74) *Attorney, Agent, or Firm* — IP & T Group LLP

(57) ABSTRACT

A data processing system includes a host suitable for generating a plurality of write data grouped into transactions and a plurality of write commands including transaction information of each of the write data; and a memory system suitable for storing the write data in a normal region of a memory device in response to the write commands received from the host, and storing the transaction information included in each of the write commands in a spare region, which corresponds to the normal region, of the memory device.

16 Claims, 15 Drawing Sheets

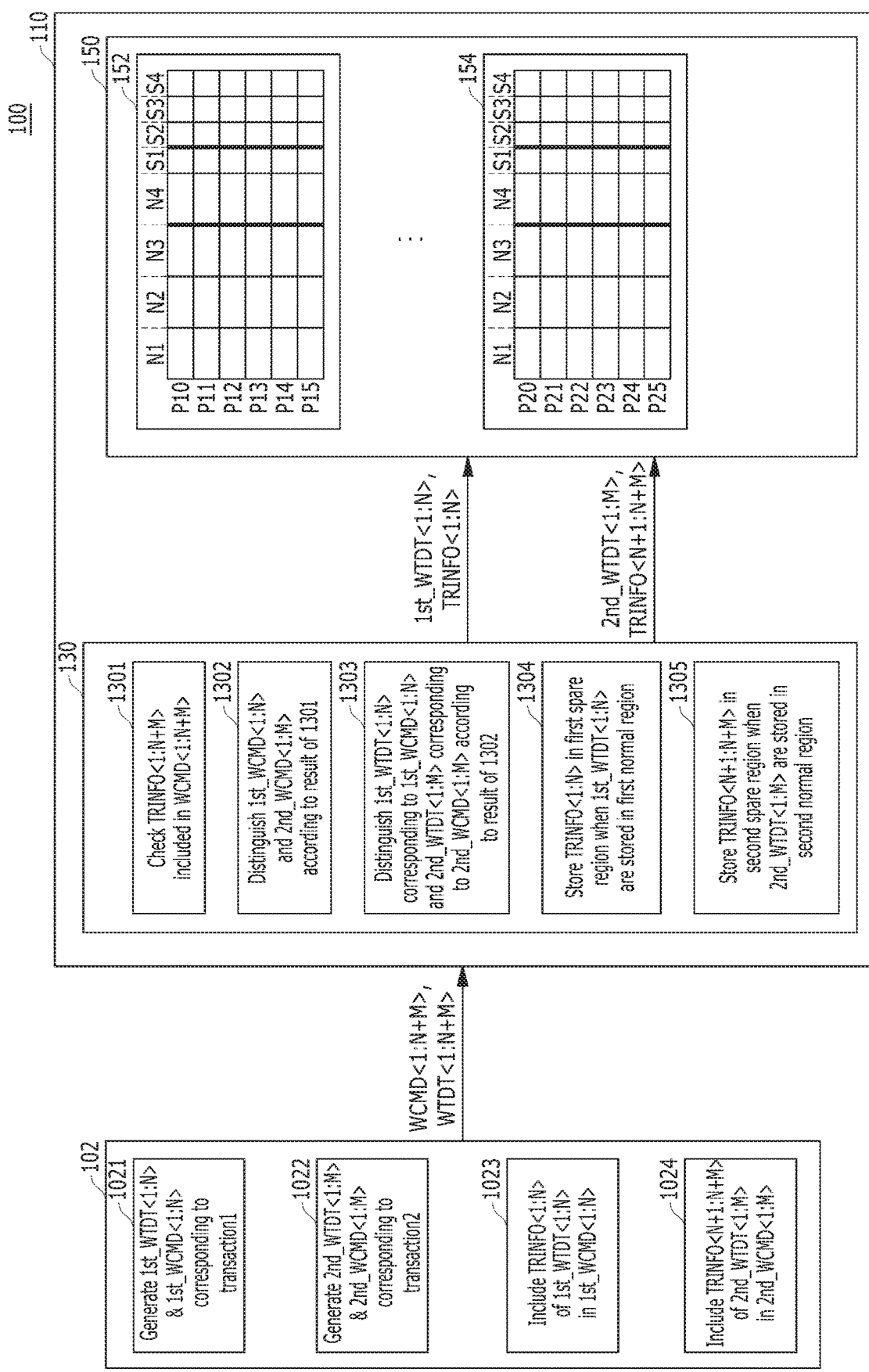

DATA PROCESSING SYSTEM FOR SECURING ATOMICITY OF TRANSACTIONS WITHOUT GENERATING SEPARATE COMMIT COMMAND, AND OPERATING METHOD THEREOF

CROSS-REFERENCE TO RELATED APPLICATIONS

The present application claims priority under 35 U.S.C. § 119(a) to Korean Patent Application No. 10-2017-0139422 filed on Oct. 25, 2017, the disclosure of which is incorporated herein by reference in its entirety.

BACKGROUND

1. Field

The present invention relates generally to a data processing system. Particularly, various embodiments of the invention relate to a data processing system capable of storing write data grouped as a transaction in a memory system, and an operating method thereof.

2. Description of the Related Art

The paradigm for computing environments is shifting toward ubiquitous computing which allows users to use computer systems anytime and anywhere. For this reason, the demand for portable electronic devices, such as mobile phones, digital cameras and laptop computers is soaring. Those electronic devices generally include a memory system using a memory device as a data storage device. The data storage device may be a main memory or an auxiliary memory of a portable electronic device.

Since a data storage device using a memory device does not have a mechanical driving device, it may have excellent stability and durability. Also, a data storage device has a quick data access rate with low power consumption. Non-limiting examples of a data storage device having such advantages include Universal Serial Bus (USB) memory devices, memory cards of diverse interfaces, Solid-State Drives (SSD) and the like.

SUMMARY

Various embodiments of the present invention are directed to a data processing system capable of storing write data grouped as a transaction, and an operating method thereof.

In accordance with an embodiment of the present invention, a data processing system includes: a host suitable for generating a plurality of write data grouped into transactions and a plurality of write commands including transaction information of each of the write data; and a memory system suitable for storing the write data in a normal region of a memory device in response to the write commands received from the host, and storing the transaction information included in each of the write commands in a spare region, which corresponds to the normal region, of the memory device.

The transaction information may include transaction ID information, commit information, and abort information.

The host may generate transaction information of each of first write data grouped into a first transaction including first ID information and commit information, and as a result of checking the transaction information of each of the write commands received from the host, the memory system identifies the write commands including the first ID information as first write commands, and identifies the write data corresponding to the first write commands as the first write data, and when the first write data are stored in a first normal region in response to the first write commands, the memory system loads and stores transaction information included in the first write commands in a first spare region corresponding to the first normal region.

The host may generate transaction information of each of second write data grouped into a second transaction including second ID information and commit information, and as a result of checking the transaction information of each of the write commands received from the host, the memory system identifies the write commands including the second ID information as second write commands, and identifies the write data corresponding to the second write commands as the second write data, and when the second write data are stored in a second normal region in response to the second write commands, the memory system loads and stores transaction information included in the second write commands in a second spare region corresponding to the second normal region.

The memory device may include a plurality of pages, the first normal region includes a first data section of a first page among the pages, the second normal region includes a second data section of the first page, the first spare region includes a first spare section of the first page, and the second spare region includes a second spare section of the first page.

The memory device may include a plurality of pages, the first normal region includes a data section of a first page among the pages, the second normal region includes a data section of a second page among the pages, the first spare region includes a spare section of the first page, and the second spare region includes a spare section of the second page.

The memory device may include a plurality of pages, the first normal region includes a data section of a first page group including at least two pages among the pages, the second normal region includes a data section of a second page group including at least two pages among the pages, the first spare region includes a spare section of the first page group, and the second spare region includes a spare section of the second page group.

The host may generate transaction information of last data among the write data including activated commit information and deactivated abort information for validating the write data, the host may generate the transaction information of the last data including deactivated commit information and activated abort information for invalidating the write data, and the host may generate transaction information of each of remaining intermediate data except for the last data among the write data including deactivated commit information and deactivated abort information.

As a result of reading and checking the transaction information of reading and checking the transaction information of the write data stored in the spare region when rebuilding the write data during a booting period where a power source is supplied again after sudden power-off (SPO) occurs while storing the write data in the memory device, when transaction information including activated commit information is retrieved, the memory system determines the write data stored in the normal region as being in a normal state and rebuilds the write data, and when transaction information including activated commit information is not retrieved or transaction information including activated abort information is retrieved, the memory system determines the write data stored in the normal region as being in an abnormal state and does not rebuild the write data.

The transaction information of each of the write data may further include start information, and the host may generate transaction information of start data among the intermediate data including deactivated commit information, deactivated abort information and activated start information.

As a result of reading and checking the transaction information of the write data stored in the spare region when rebuilding the write data during a booting period where a power source is supplied again after sudden power-off (SPO) occurs while storing the write data in the memory device, when transaction information including activated commit information and transaction information including activated start information are retrieved, the memory system determines the write data stored in the normal region as being in a normal state and rebuilds the write data, and when either transaction information including activated start information or transaction information including activated commit information is not retrieved, the memory system determines the write data stored in the normal region as being in an abnormal state and does not rebuild the write data.

In accordance with an embodiment of the present invention, an operating method of a data processing system including a host suitable for generating a plurality of write data grouped into transactions and a plurality of write commands, and a memory system suitable for storing the write data in a memory device in response to the write commands received from the host, may include generating, by the host, the write commands including transaction information of each of the write data; and storing, by the memory system, the write data in a normal region of the memory device and the transaction information included in each of the write commands in a spare region, which corresponds to the normal region, of the memory device.

The transaction information may include transaction ID information, commit information, and abort information.

First ID information, commit information and abort information may be included in transaction information of each of first write data grouped into a first transaction, and the storing of the write data in the normal region and the transaction information in the spare region of the memory device may include: identifying the write commands including the first ID information as first write commands and the write data corresponding to the first write commands as the first write data as a result of checking the transaction information of each of the write commands received from the host; and loading and storing transaction information included in the first write commands in a first spare region corresponding to a first normal region when the first write data are stored in the first normal region in response to the first write commands.

Second ID information, start information and commit information may be included in transaction information of each of second write data grouped into a second transaction, and the storing of the write data in the normal region and the transaction information in the spare region of the memory device may further include: identifying the write commands including the second ID information as second write commands and the write data corresponding to the second write commands as the second write data as a result of checking the transaction information of each of the write commands received from the host; and loading and storing transaction information included in the second write commands in a second spare region corresponding to a second normal region when the second write data are stored in the second normal region in response to the second write commands.

The memory device may include a plurality of pages, the first normal region includes a first data section of a first page among the pages, the second normal region includes a second data section of the first page, the first spare region includes a first spare section of the first page, and the second spare region includes a second spare section of the first page.

The memory device may include a plurality of pages, the first normal region may be a plurality of pages, the first normal region includes a data section of a first page among the pages, the second normal region includes a data section of a second page among the pages, the first spare region includes a spare section of the first page, and the second spare region includes a spare section of the second page.

The memory device may include a plurality of pages, the first normal region includes a data section of a first page group including two or more pages among the pages, the second normal region includes a data section of a second page group including two or more pages among the pages, the first spare region includes a spare section of the first page group, and the second spare region includes a spare section of the second page group.

The generating of the write commands of the transaction information of each of the write data may include: generating transaction information of last data among the write data including activated commit information and deactivated abort information into transaction information of last data among the write data for validating the write data, generating the transaction information of the last data including deactivated commit information and activated abort information for invalidating the write data, and generating transaction information of each of remaining intermediate data except for the last data among the write data including deactivated commit information and deactivated abort information.

The operating method may further include reading and checking the transaction information of the write data stored in the spare region when rebuilding the write data during a booting period where a power source is supplied again after sudden power-off (SPO) occurs while the memory system stores the write data in the memory device; determining the write data stored in the normal region as being in a normal state and rebuilding the write data when transaction information including activated commit information is retrieved as a result of the reading and checking of the transaction information; and determining the write data stored in the normal region as being in an abnormal state and not rebuilding the write data when transaction information including activated commit information is not retrieved or transaction information including activated abort information is retrieved as a result of the reading and checking of the transaction information.

In accordance with an embodiment of the present invention, a memory system may include: a memory device including a first region and a second region corresponding to the first region; and a controller suitable for: receiving a plurality of write data grouped into transactions and a plurality of write commands including transaction information of each of the write data; storing the write data in the first region in response to the write commands; and storing the transaction information included in each of the write commands in the second region.

The including and generating of the transaction information of each of the write data into the write commands may include: including and generating activated commit information and deactivated abort information into transaction information of last data among the write data in order to validate the write data, including and generating deactivated commit information and activated abort information into the transaction information of the last data in order to invalidate the write data, and including and generating deactivated commit information and deactivated abort information into transaction information of each of remaining intermediate data except for the last data among the write data. The operating method may further include: reading and checking the transaction information of the write data stored in the spare region when rebuilding the write data during a booting period where a power source is supplied again after sudden power-off (SPO) occurs while the memory system stores the write data in the memory device; determining the write data stored in the normal region as being in a normal state and rebuilding the write data when transaction information including activated commit information is retrieved as a result of the reading and checking of the transaction information; and determining the write data stored in the normal region as being in an abnormal state and not rebuilding the write data when transaction information including activated commit information is not retrieved or transaction information including activated abort information is retrieved as a result of the reading and checking of the transaction information.

These and other features and advantages of the present invention will become apparent to those with ordinary skill in the art to which the present invention belongs from the following description in conjunction with the accompanying drawings.

BRIEF DESCRIPTION OF THE DRAWINGS

FIG. 5 is a diagram illustrating an operation of processing a plurality of write data grouped into transactions in a data processing system in accordance with an embodiment of the present invention.

DETAILED DESCRIPTION

Figure 1:
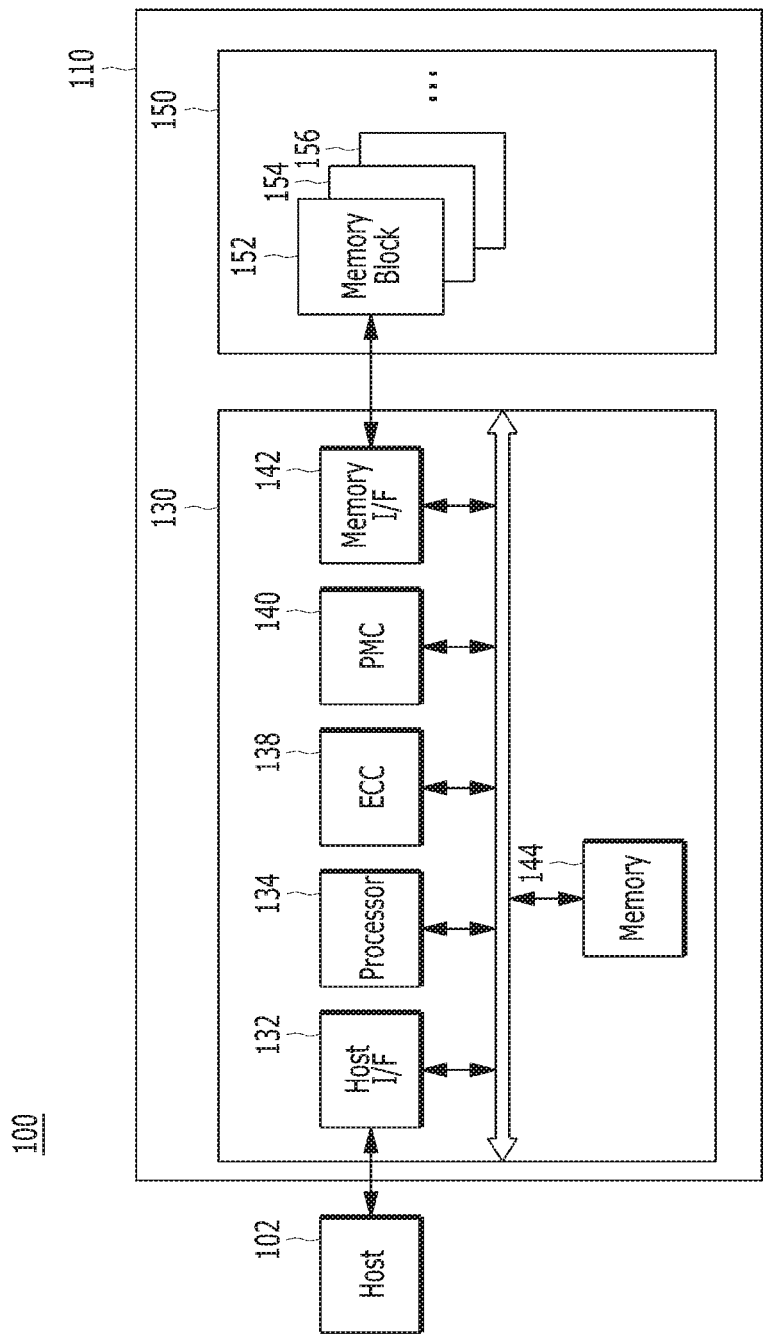
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) 132, a processor 134, an error correction code (ECC) circuit 138, a power management circuit (PMC) 140, a memory device controller such as a memory interface (I/F) 142 and a memory 144 all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (DATA), small computer system interface (SCSI), enhanced small disk interface (ESDI) and integrated drive electronics (IDE).

The ECC circuit 138 may detect and correct errors in the data read from the memory device 150 during the read operation. The ECC circuit 138 may not correct error bits when the number of the error bits is greater than or equal to a threshold number of correctable error bits, and may output an error correction fail signal indicating failure in correcting the error bits.

The ECC circuit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC circuit 138 may include all circuits, modules, systems or devices for the error correction operation.

The PMU 140 may provide and manage powerof the controller 130.

The memory interface 142 may serve as a memory/storage interface between the controller 130 and the memory device 150 to allow the controller 130 to control the memory device 150 in response to a request from the host 102. The memory interface 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the present disclosure is not limited thereto. That is, the memory 144 may be disposed within or out of the controller 130. For instance, in an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

A FTL may perform an operation as an interface between the host 102 and the memory device 150. The host 102 may request the memory device 150 to perform write and read operations through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management circuit (not shown) may be included in the processor 134, and may perform bad block management of the memory device 150. The management circuit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks seriously deteriorate the utilization efficiency of the memory device 150 having a 3D stack structure and the reliability of the memory system 100, and thus reliable bad block management is required.

Figure 2:
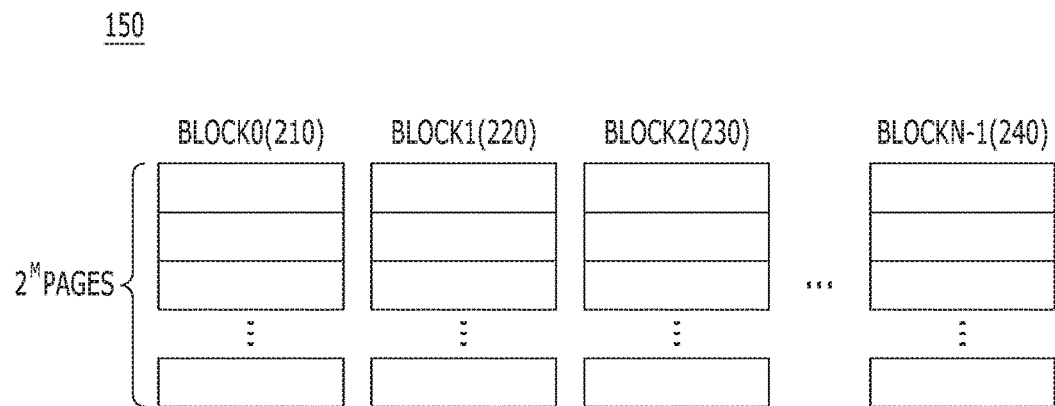
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks BLOCK 0 to BLOCKN−1, and each of the blocks BLOCK 0 to BLOCKN−1 may include a plurality of pages, for example, $2^M$ pages, the number of which may vary according to circuit design. The memory device 150 may include a plurality of memory blocks, such as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
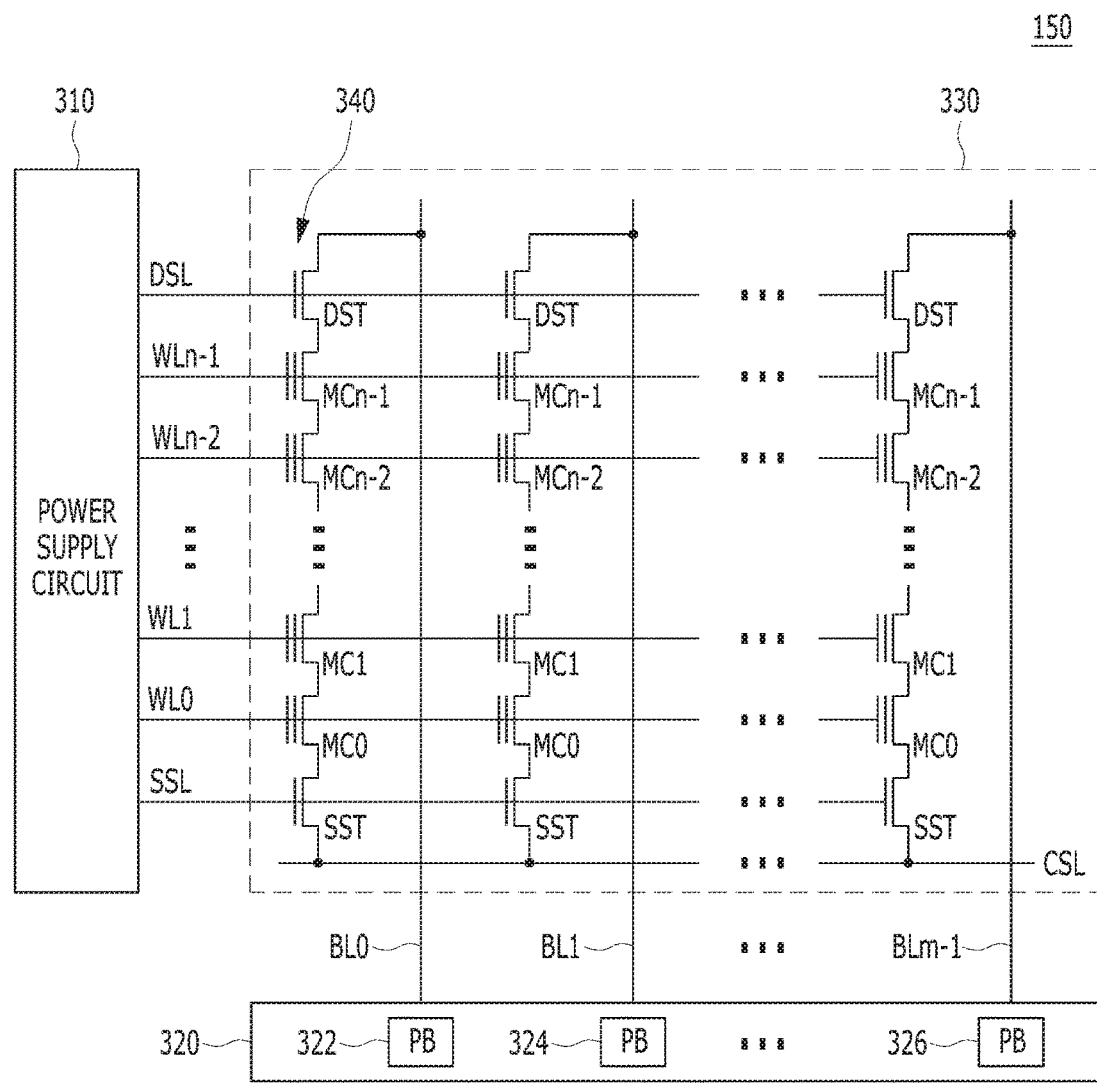
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 corresponds to any of the plurality of memory blocks 152 to 156.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines or column pairs (or bit line pairs), and each of the page buffers 322 to 326 may include a plurality of latches (not illustrated).

Figure 4:
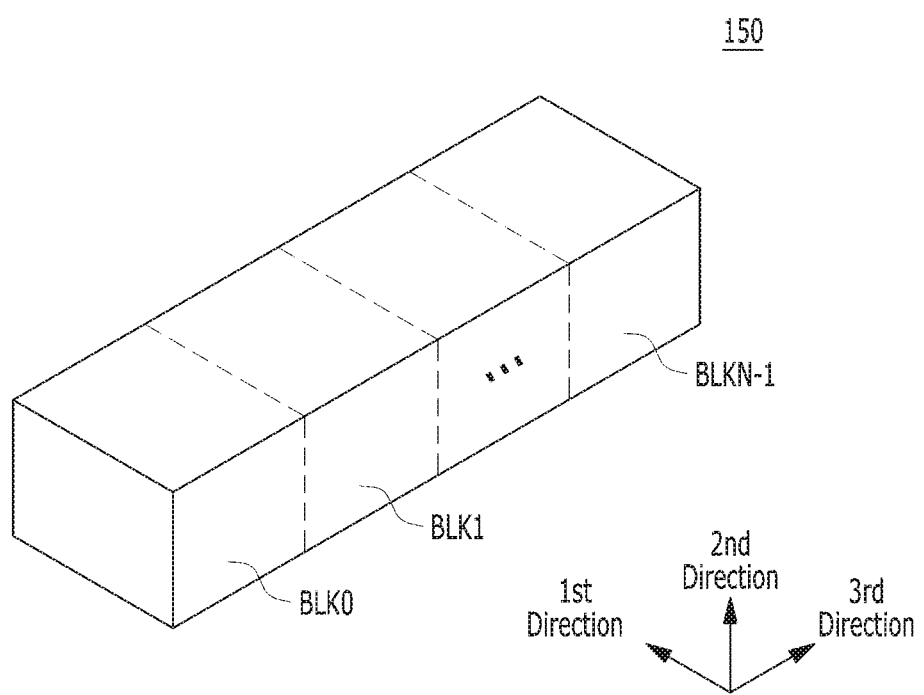
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIG. 5 is a diagram illustrating an operation of processing a plurality of write data grouped into transactions in a data processing system in accordance with an embodiment of the present invention.

Referring to FIG. 5, the data processing system 100 may include the host 102 and the memory system 110. The data processing system 100 may have the configuration shown in FIG. 1.

The memory system 110 may include the controller 130 and the memory device 150 as described above with reference to FIG. 1.

The memory device 150 may include the plurality of memory blocks 152 and 154 as described above with reference to FIG. 1. Each of the memory blocks 152 and 154 may include a plurality of pages, e.g., $2^M$ PAGES as described above with reference to FIG. 2.

Although FIG. 5 shows just a single non-volatile memory device 150 included in the memory system 110, we note that a plurality of non-volatile memory devices may be included in the memory system 110. Also, for the sake of convenience in description, only five pages P10 to P15 are shown in memory block 152 and only five pages are shown in memory block 154. It is noted that the number of pages in each block may be different.

Although it is illustrated that the host interface (I/F) 132, the processor 134, the error correction code (ECC) circuit 138, the power management circuit (PMC) 140, the NAND flash controller 142 and the memory 144 included in the controller 130 of FIG. 1 are not included in the controller 130 of FIG. 5, they are omitted in the drawing for the sake of convenience in description. In actuality, they may be included in the controller 130.

Referring to FIG. 5, the host 102 may generate a plurality of write data WTDT<1:N+M> grouped into transactions and a plurality of write commands WCMD<1:N+M> for controlling an operation of storing the write data WTDT<1:N+M> in the memory system 110, and transmit the generated write data WTDT<1:N+M> and write commands WCMD<1:N+M> to the memory system 110.

The memory system 110 may store the write data WTDT<1:N+M> in the memory device 150 in response to the write commands WCMD<1:N+M> received from the host 102.

According to the present invention, the write data WTDT<1:N+M> are grouped into a plurality of transactions, hence, the write operation performed in the data processing system 100 of the present invention is different from a conventional write operation performed in a conventional data processing system.

According to the present invention, grouping the write data WTDT<1:N+M> into a plurality of transactions means that a plurality of write data, which are used for the same purpose are grouped into a single transaction. For example, first write data 1st_WTDT<1:N> and second write data 2nd_WTDT<1:M> among the write data WTDT<1:N+M>, which are used for the same purpose, are grouped into a single transaction.

Examples of various data purposes may be modification, addition, or update of data. Hence, in an embodiment, write data used for modification of data may be grouped into one transaction, write data used for addition of data may be grouped into another transaction, and write data used for the purpose of update of data may be grouped into yet another transaction. In sum, write data may be grouped into a plurality of transactions depending on the purpose of the write data. In another embodiment, data for the purpose of modification of the database may be grouped into one transaction group, and data for the purpose of addition to the database may be grouped into another transaction group.

When the host 102 transmits the write data grouped into one transaction, e.g., the first write data 1st_WTDT<1:N> or the second write data 2nd_WTDT<1:M>, to the memory system 110, all the data which are grouped into one transaction should be transmitted from the host 102 and stored in the memory system 110 so that the data of the transaction can be designated as being in a valid commit state. If at least one of the data of a transaction is not transmitted and stored then none of the data of the transaction can be placed in a valid commit state. Also, all the data of a transaction may be placed in an invalid abort state according to an abort request received from the host 102.

That is, the write data grouped into one transaction, e.g., the first write data 1st_WTDT<1:N> or the second write data 2nd_WTDT<1:M>, may be valid only when they are all transmitted and stored so as to be all in the valid commit state.

For example, for the first write data 1st_WTDT<1:N> which are grouped into a first transaction to be placed in the valid commit state in the memory system 110, all of the "N" first write data 1st_WTDT<1:N> should be transmitted and stored from the host 102 into the memory system 110, and simultaneously there has to be no abort request received from the host 102. When even one of the "N" first write data 1st_WTDT<1:N> is not transmitted and stored, or when the abort request from the host 102 is received before the completion of the transmission and storage of all of the first write data 1st_WTDT<1:N>, then all the first write data 1st_WTDT<1:N> are placed in the abort state in the memory system 110.

The described operation of dividing and managing the write data WTDT<1:N+M> grouped into transactions into the commit state or the abort state is generally referred to herein as an operation for securing the atomicity of the transactions.

When the write data WTDT<1:N+M> are transmitted from the host 102 to the memory system 110, the write data grouped into a plurality of transactions, e.g., the first write data 1st_WTDT<1:N> or the second write data 2nd_WTDT<1:M>, may be transmitted in a randomly mixed state to the memory system 110. For example, when the first write data 1st_WTDT<1:N> grouped into the first transaction and the second write data 2nd_WTDT<1:M> grouped into a second transaction are transmitted from the host 102 to the memory system 110, the first write data 1st_WTDT<1:N> and the second write data 2nd_WTDT<1:M> may be distinguished by an identifying transaction ID, and may be transmitted as the write data WTDT<1:N+M> in the randomly mixed state.

Figure 6A:
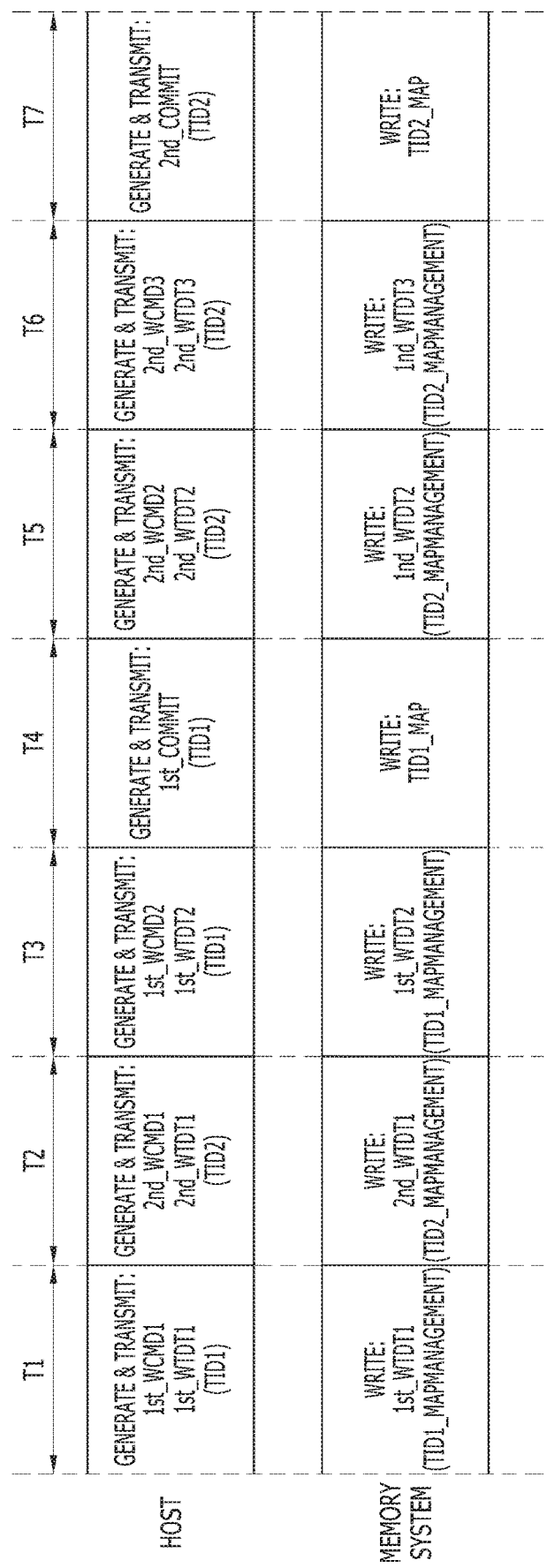
FIGS. 6A to 6C are diagrams illustrating an operation of processing a plurality of write data grouped into transactions in a data processing system in accordance with an embodiment of the present invention.

In an embodiment, the write data WTDT<1:N+M> may be grouped into a plurality of transactions generated from the host 102 and may then be transmitted in a randomly mixed state to the memory system 110 according to an exemplary method illustrated in FIG. 6A.

Referring to FIG. 6A, the host 102 may generate first write data 1st_WTDT<1:2> grouped into the first transaction and first write commands 1st_WCMD<1:2> including first transaction ID TID1 to control an operation of storing the first write data 1st_WTDT<1:2> in the memory system 110, and may transmit the first write data 1st_WTDT<1:2> and the first write commands 1st_WCMD<1:2> to the memory system 110.

Also, the host 102 may generate second write data 2nd_WTDT<1:3> grouped into the second transaction and second write commands 2nd_WCMD<1:3> including second transaction ID TID2 to control an operation of storing the second write data 2nd_WTDT<1:3> in the memory system 110, and may transmit the second write data 2nd_WTDT<1:3> and the second write commands 2nd_WCMD<1:3> to the memory system 110.

At this time, each of the first write commands 1st_WCMD<1:2> and each of the first write data 1st_WTDT<1:2> may be transmitted at a time point T1 and a time point T3 which are discontinuous with each other. Each of the second write commands 2nd_WCMD<1:3> and each of the second write data 2nd_WTDT<1:3> may be transmitted at a time point T2, a time point T5 and a time point T6 which are discontinuous with each other.

In this manner, the first write commands 1st_WCMD<1:2> and first write data 1st_WTDT<1:2> and the second write commands WCMD<1:3> and second write data 2nd_WTDT<1:3> may be transmitted in a randomly mixed state from the host 102 to the memory system 110.

As a result of checking that the write commands WCMD<1:2+3> transmitted from the host 102 at the time points T1 and T3 include the first transaction ID TID1, the memory system 110 may identify the write commands WCMD<1:2+3> transmitted from the host 102 at the time points T1 and T3 as the first write commands 1st_WCMD<1:2> and the write data WTDT<1:2+3> transmitted from the host 102 at the time points T1 and T3 as the first write data 1st_WTDT<1:2> grouped into the first transaction.

Accordingly, the memory system 110 may store the first write data 1st_WTDT<1:2> in the memory device 150 in response to the first write commands 1st_WCMD<1:2>. The memory system 110 may manage first map information TID1_MAP for indicating that the first write data 1st_WTDT<1:2> stored in the memory device 150 at the time points T1 and T3 are included in a first transaction group. That is, the memory system 110 may use a way of including information indicating that the first write data 1st_WTDT<1:2> are grouped into the first transaction in the first map information TID1_MAP that manages a mapping relationship between a physical address and a logical address for the first write data 1st_WTDT<1:2>. The first map information TID1_MAP may be managed in the memory 144 having volatile characteristics in the memory system 110 before it is identified that the first write data 1st_WTDT<1:2> are in the commit state, and then may be stored in the memory device 150 having non-volatile characteristics when it is identified that the first write data 1st_WTDT<1:2> are in the commit state.

In this case, the host 102 may recognize that the first write data 1st_WTDT<1:2> include two data, but the memory system 110 may not. Accordingly, after the first write data 1st_WTDT<1:2> are transmitted from the host 102 to the memory system 110, the host 102 may generate a first commit command 1st_COMMIT for indicating that transmission of the first write data 1st_WTDT<1:2> is completed, and transmit the first commit command 1st_COMMIT to the memory system 110. That is, as illustrated in the drawing, the host 102 may generate and transmit the first commit command 1st_COMMIT to the memory system 110 at a time point T4 subsequent to the time point T3 where the transmission of the first write data 1st_WTDT<1:2> is completed. Accordingly, the memory system 110 may check the first write data 1st_WTDT<1:2> being in the commit state, and store the first map information TID1_MAP managed in the memory 144 in the memory device 150.

Similarly, as a result of checking that the write commands WCMD<1:2+3> transmitted from the host 102 at the time points T2, T5 and T6 include the second transaction ID TID2, the memory system 110 may identify the write commands WCMD<1:2+3> transmitted from the host 102 at the time points T2, T5 and T6 as the second write commands 2nd_WCMD<1:3> and the write data WTDT<1:2+3> transmitted from the host 102 at the time points T2, T5 and T6 as the second write data 2nd_WTDT<1:3> grouped into the second transaction.

Accordingly, the memory system 110 may store the second write data 2nd_WTDT<1:3> in the memory device 150 in response to the second write commands 2nd_WCMD<1:3>. The memory system 110 may manage second map information TID2_MAP for indicating that the second write data 2nd_WTDT<1:3> stored in the memory device 150 at the T2, T5 and T6 time points are included in a second transaction group. That is, the memory system 110 may use a way of including information indicating that the second write data 2nd_WTDT<1:3> are grouped into the second transaction in the second map information TID2_MAP that manages a mapping relationship between a physical address and a logical address for the second write data 2nd_WTDT<1:3>. The second map information TID2_MAP may be managed in the memory 144 of the memory system 110 before it is identified that the second write data 2nd_WTDT<1:3> are in the commit state, and then may be stored in the memory device 150 having non-volatile characteristics when it is identified that the second write data 2nd_WTDT<1:3> are in the commit state.

In This case, the host 102 may recognize that the second write data 2nd_WTDT<1:3> include three data, but the memory system 110 may not. Accordingly, after the second write data 2nd_WTDT<1:3> are transmitted from the host 102 to the memory system 110, the host 102 may generate a second commit command 2nd_COMMIT for indicating that transmission of the second write data 2nd_WTDT<1:3> is completed, and transmit the second commit command 2nd_COMMIT to the memory system 110. That is, as illustrated in the drawing, the host 102 may generate and transmit the second commit command 2nd_COMMIT to the memory system 110 at a time point T7 subsequent to the time point T6 where the transmission of the second write data 2nd_WTDT<1:3> is completed. Accordingly, the memory system 110 may check the second write data 2nd_WTDT<1:3> being in the commit state, and store the second map information TID2_MAP managed in the memory 144 in the memory device 150.

A case where it is checked that the first write data 1st_WTDT<1:2> and the second write data 2nd_WTDT<1:3> are in the commit state is exemplified in the aforementioned description. When the state of the first write data 1st_WTDT<1:2> or second write data 2nd_WTDT<1:3> is transitioned into the abort state according to the abort request of the host 102, an abort command (not illustrated) may be transmitted from the host 102 to the memory system 110 regardless of a time point. For example, when the state of the first write data 1st_WTDT<1:2> is transitioned into the abort state, the host 102 may transmit the abort command (not illustrated) instead of the first write commands 1st_WCMD<2> and the first write data 1st_WTDT<2> to the memory system 110 at the time point T3. For another example, when the state of the first write data 1st_WTDT<1:2> is transitioned into the abort state, the host 102 may transmit the abort command (not illustrated) instead of the first commit command 1st_COMMIT to the memory system 110 at the time point T4.

As described above with reference to FIG. 6A, it may be seen that the host 102 generates and transmits the commit commands 1st_COMMIT and 2nd_COMMIT to secure atomicity of the transactions while generating and transmitting the write data WTDT<1:2+3> grouped into the plurality of transactions to the memory system 110. Also, the memory system 110 may manage the map information TID1_MAP and TID2_MAP for the write data WTDT<1:2+3> grouped into the transactions just in the memory 144 before the commit commands 1st_COMMIT and 2nd_COMMIT are transmitted from the host 102, and then may store the map information TID1_MAP and TID2_MAP in the memory device 150 after the commit commands 1st_COMMIT and 2nd_COMMIT are transmitted from the host 102, thereby supporting an operation of securing the atomicity of the transactions.

However, in the operation as shown in FIG. 6A, there is a burden on the host 102 to generate the separate commit commands 1st_COMMIT and 2nd_COMMIT in order to support the operation of securing the atomicity of the transactions, and there is a burden on the memory system 110 to store the map information TID1_MAP and TID2_MAP in the memory device 150 whenever commits of the transactions are checked.

Figure 6B:
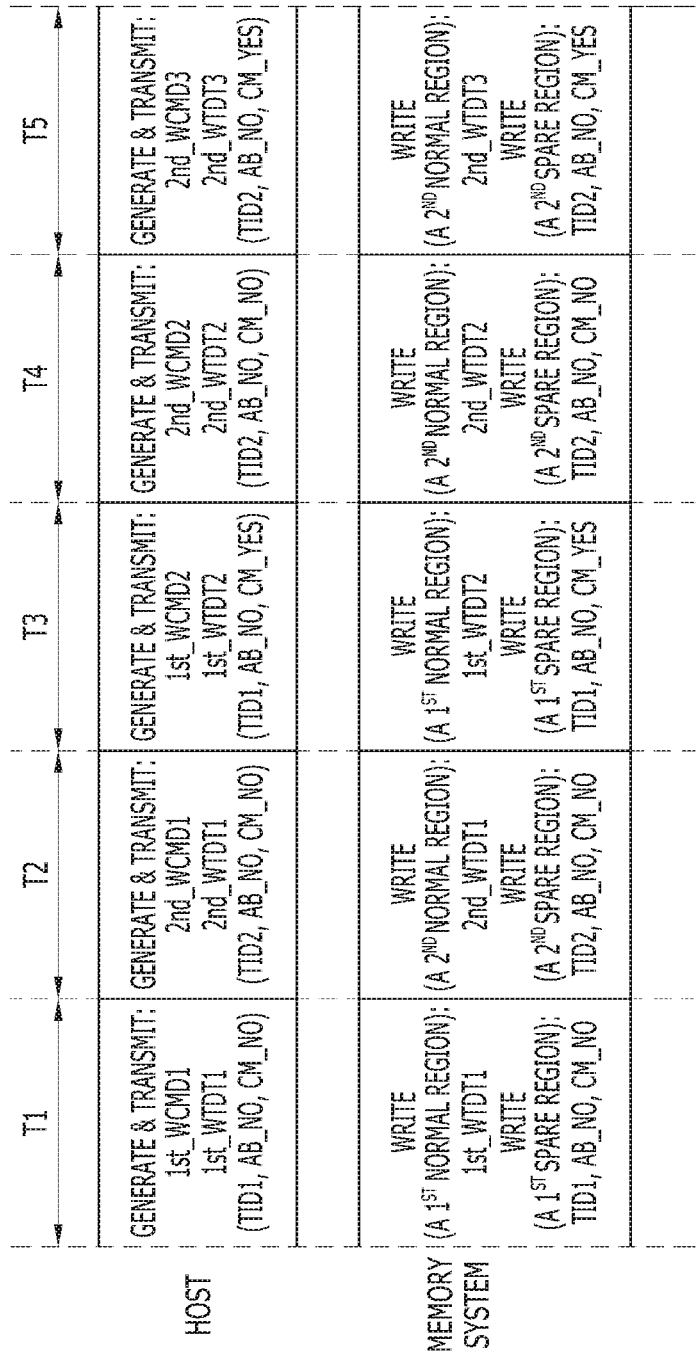
Figure 6C:
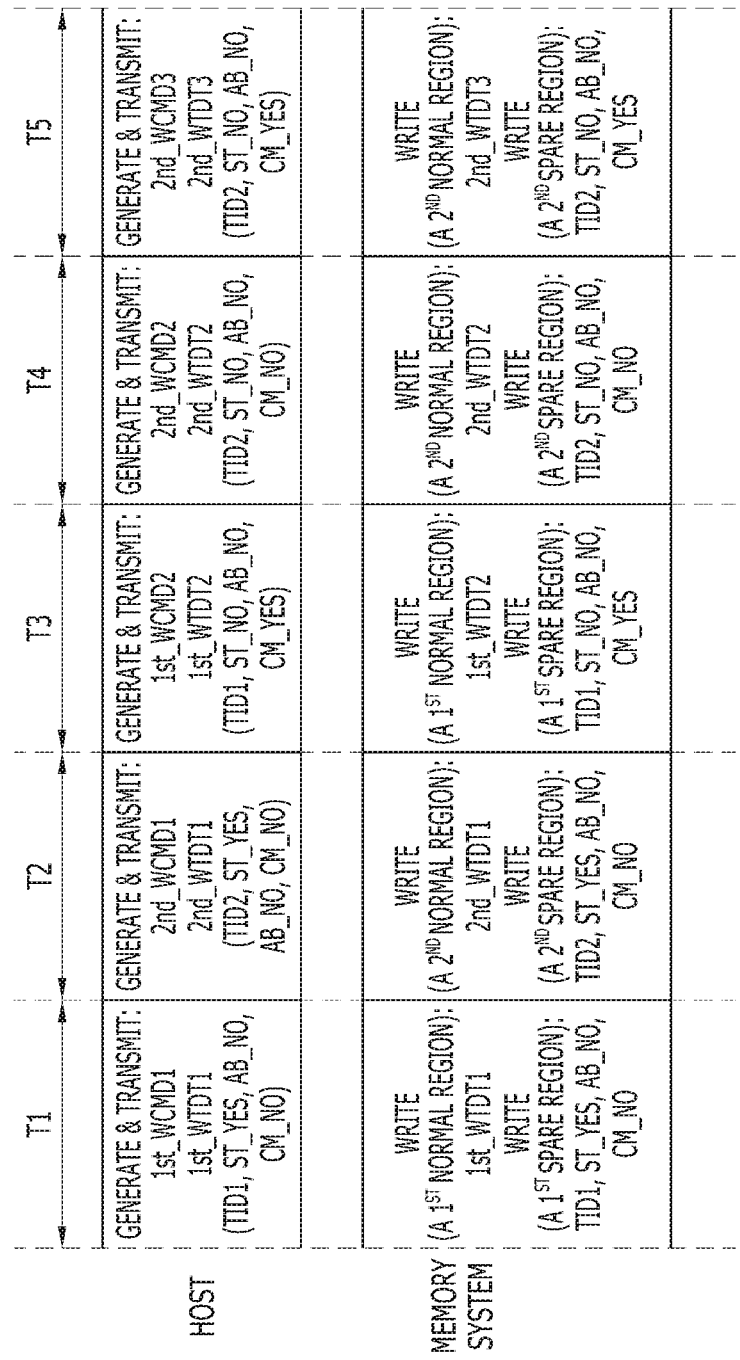

Another method illustrated in FIGS. 5, 6B and 6C may be applied to the data processing system 100 in accordance with an embodiment of the present invention. The method addresses the aforementioned limitations of the method described with reference to FIGS. 5 and 6A.

Referring again to FIG. 5, the host 102 may generate the write data WTDT<1:N+M> grouped into a plurality of transactions and the write commands WCMD<1:N+M> including transaction information TRINFO<1:N+M> of the write data WTDT<1:N+M>. For example, the host 102 may generate the first write data 1st_WTDT<1:N> corresponding to the first transaction and the first write commands 1st_WCMD<1:N> for controlling an operation of storing the first write data 1st_WTDT<1:N> in the memory system 110 in operation 1021. In this case, the host 102 may include transaction information TRINFO<1:N> of the first write data 1st_WTDT<1:N> in the first write commands 1st_WCMD<1:N>, respectively, in operation 1023. Also, the host 102 may generate the second write data 2nd_WTDT<1:M> corresponding to the second transaction and the second write commands 2nd_WCMD<1:M> for controlling an operation of storing the second write data 2nd_WTDT<1:M> in the memory system 110 in operation 1022. In this case, the host 102 may include transaction information TRINFO<N+1:N+M> of the second write data 2nd_WTDT<1:M> in the second write commands 2nd_WCMD<1:M>, respectively, in operation 1024.

Figure 7A:
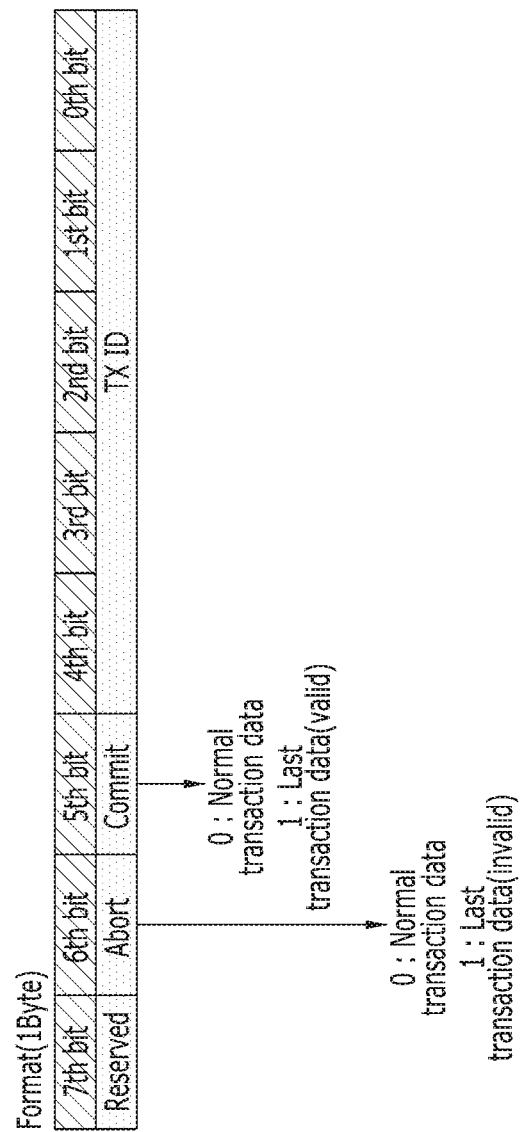
FIGS. 7A and 7B are diagrams illustrating examples of transaction information in a data processing system in accordance with an embodiment of the present invention.

In various embodiments, the transaction information TRINFO<1:N+M> of the write data WTDT<1:N+M> generated from the host 102, as illustrated in FIG. 7A, may include transaction ID information TX ID, commit information Commit, and abort information Abort.

In some embodiments, the transaction ID information may indicate which transaction each of the write data WTDT<1:N+M> is grouped into. For example, it may be assumed that the host 102 generates the first write data 1st_WTDT<1:N> grouped into the first transaction and the second write data 2nd_WTDT<1:M> grouped into the second transaction. In this state, the transaction information TRINFO<1:N> corresponding to the first write data 1st_WTDT<1:N> may include the first transaction ID TID1 indicating that the first write data 1st_WTDT<1:N> are grouped into the first transaction as the transaction ID information. Similarly, the transaction information TRINFO<N+1:N+M> corresponding to the second write data 2nd_WTDT<1:M> may include the second transaction ID TID2 indicating that the second write data 2nd_WTDT<1:M> are grouped into the second transaction as the transaction ID information.

In some embodiments, the commit information and the abort information may indicate whether all the write data WTDT<1:N+M> are placed in the valid commit state or in the invalid abort state, respectively.

For example, as shown in FIG. 7A, when the commit information is included in the Nth first write data 1st_WTDT<N> which is last data among the first write data 1st_WTDT<1:N>, all the first write data 1st_WTDT<1:N> may be placed in the valid commit state. On the contrary, when the abort information is included in the Nth first write data 1st_WTDT<N>, all the first write data 1st_WTDT<1:N> may be placed in the invalid abort state.

Similarly, when the commit information is included in the Mth second write data 2nd_WTDT<M> which is last data among the second write data 2nd_WTDT<1:M>, all the second write data 2nd_WTDT<1:M> may be placed in the valid commit state. On the contrary, when the abort information is included in the Mth second write data 2nd_WTDT<M>, all the second write data 2nd_WTDT<1:M> may be placed in the invalid abort state.

Since each of the commit information and the abort information determines the write data 1st_WTDT<1:N> or 2nd_WTDT<1:M> as the respective commit state and abort state, the commit information and the abort information may be included in the last data 1st_WTDT<N> or 2nd_WTDT<M> among the write data 1st_WTDT<1:N> or 2nd_WTDT<1:M>, respectively.

Therefore, as shown in FIG. 6B, the transaction information TRINFO<1:N−1> corresponding to the first to (N−1)th first write data 1st_WTDT<1:N−1> may include deactivated commit information CM_NO and deactivated abort information AB_NO. The transaction information TRINFO<N> corresponding to the Nth first write data 1st_WTDT<N> may include activated commit information CM_YES and deactivated abort information AB_NO or deactivated commit information CM_NO and activated abort information AB_YES.

Similarly, as shown in FIG. 6B, the transaction information TRINFO<N+1:N+M−1> corresponding to the first to (M−1)th second write data 2nd_WTDT<1:M−1> may include deactivated commit information CM_NO and deactivated abort information AB_NO. The transaction information TRINFO<N+M> corresponding to the Mth second write data 2nd_WTDT<M> may include activated commit information CM_YES and deactivated abort information AB_NO. Alternatively, the transaction information TRINFO<N+M> corresponding to the Mth second write data 2nd_WTDT<M> may include deactivated commit information CM_NO and activated abort information AB_YES.

Herein, an example of the transaction information TRINFO<1:N+M> may refer to a format of the transaction information TRINFO<1:N+M> shown in FIG. 7A. For example, when it is assumed that each of the transaction information TRINFO<1:N+M> has a 1 byte, five bits ($0^{th}$ bit to $4^{th}$ bit) may be allocated as the transaction ID information, one bit ($5^{th}$ bit) may be allocated as the commit information, one bit ($6^{th}$ bit) may be allocated as the abort information, and remaining one bit ($7^{th}$ bit) may be allocated as a reserved information.

Figure 7B:
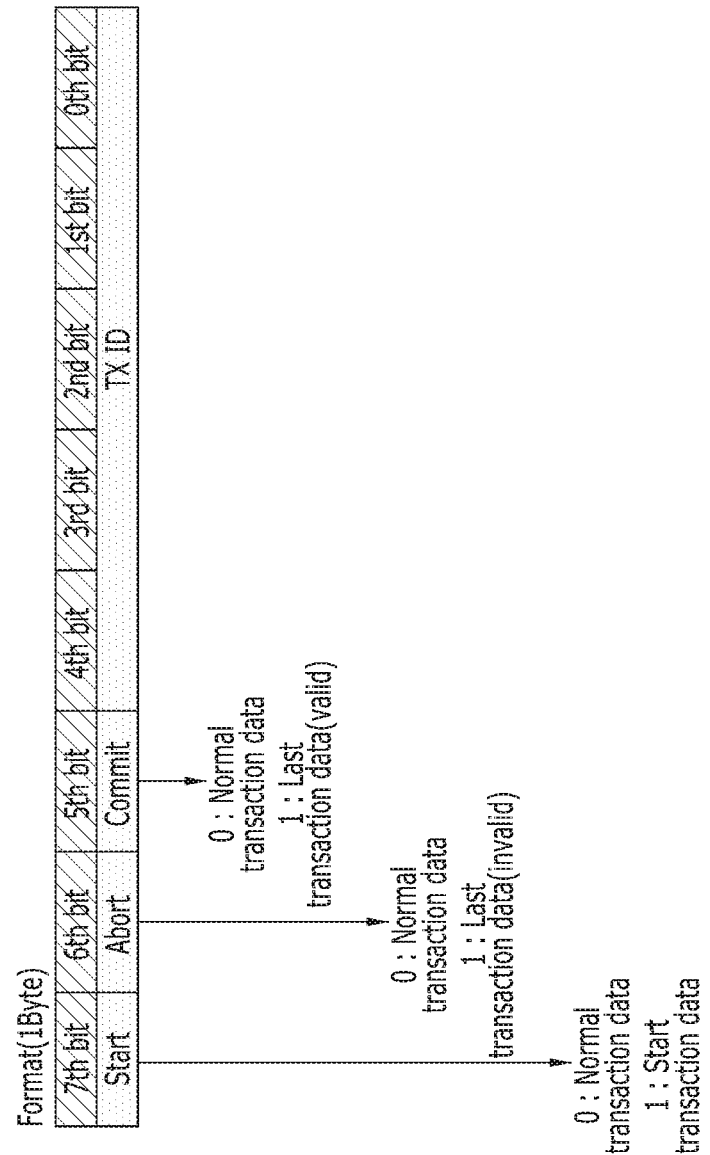

In various embodiments, the transaction information TRINFO<1:N+M> of the write data WTDT<1:N+M> generated from the host 102, as illustrated in FIG. 7B, may include transaction ID information TX ID, commit information Commit, abort information Abort, and start information Start.

In some embodiments, the transaction ID information may indicate which transaction each of the write data WTDT<1:N+M> is grouped into. For example, it may be assumed that the host 102 generates the first write data 1st_WTDT<1:N> grouped into the first transaction and the second write data 2nd_WTDT<1:M> grouped into the second transaction. In this stage, the transaction information TRINFO<1:N> corresponding to the first write data 1st_WTDT<1:N> may include the first transaction ID TID1 indicating that the first write data 1st_WTDT<1:N> are grouped into the first transaction as the transaction ID information. Similarly, the transaction information TRINFO<N+1:N+M> corresponding to the second write data 2nd_WTDT<1:M> may include the second transaction ID TID2 indicating that the second write data 2nd_WTDT<1:M> are grouped into the second transaction as the transaction ID information.

In some embodiments, the commit information and the abort information may indicate whether all the write data WTDT<1:N+M> are placed in the valid commit state or in the invalid abort state, respectively.

For example, as shown in FIG. 7B, when the commit information is included in the Nth first write data 1st_WTDT<N> which is last data among the first write data 1st_WTDT<1:N>, all the first write data 1st_WTDT<1:N> may be placed in the valid commit state. On the contrary, when the abort information is included in the Nth first write data 1st_WTDT<N>, all the first write data 1st_WTDT<1:N> may be placed in the invalid abort state.

Similarly, when the commit information is included in the Mth second write data 2nd_WTDT<M> which is last data among the second write data 2nd_WTDT<1:M>, all the second write data 2nd_WTDT<1:M> may be placed in the valid commit state. On the contrary, when the abort information is included in the Mth second write data 2nd_WTDT<M>, all the second write data 2nd_WTDT<1:M> may be placed in the invalid abort state.

Since each of the commit information and the abort information determines the write data 1st_WTDT<1:N> or 2nd_WTDT<1:M> as the respective commit state and abort state, the commit information and the abort information may be included in the last data 1st_WTDT<N> or 2nd_WTDT<M> among the write data 1st_WTDT<1:N> or 2nd_WTDT<1:M>, respectively.

In some embodiments, the start information may indicate start data 1st_WTDT<1> or 2nd_WTDT<1> of the write data 1st_WTDT<1:N> or 2nd_WTDT<1:M>.

Therefore, as shown in FIG. 6C, the transaction information TRINFO<1> corresponding to the first write data 1st_WTDT<1> may include activated start information ST_YES, deactivated commit information CM_NO and deactivated abort information AB_NO, and the transaction information TRINFO<2:N-1> corresponding to the second to (N-1)th first write data 1st_WTDT<2:N-1> may include deactivated start information ST_NO, deactivate commit information CM_NO and deactivated abort information AB_NO. The transaction information TRINFO<N> corresponding to the Nth first write data 1st_WTDT<N> may include deactivated start information ST_NO, activated commit information CM_YES and deactivate abort information AB_NO or deactivated start information ST_NO, deactivated commit information CM_NO and activated abort information CM_YES.

Similarly, as shown in FIG. 6C, the transaction information TRINFO<N+1> corresponding to the second write data 2nd_WTDT<1> may include activated start information ST_YES, deactivated commit information CM_NO and deactivated abort information AB_NO. The transaction information TRINFO<N+2:N+M-1> corresponding to the second to (M-1)th second write data 2nd_WTDT<2:M-1> may include deactivated start information ST_NO, deactivated commit information CM_NO and deactivated abort information AB_NO. The transaction information TRINFO<N+M> corresponding to the Mth second write data 2nd_WTDT<M> may include deactivated start information ST_NO, activated commit information CM_YES and deactivated abort information CM_NO. Alternatively, the transaction information TRINFO<N+M> corresponding to the Mth second write data 2nd_WTDT<M> may include deactivated start information ST_NO, deactivated commit information CM_NO and activated abort information AB_YES.

Herein, an example of the transaction information TRINFO<1:N+M> may refer to a format of the transaction information TRINFO<1:N+M> shown in FIG. 7B. For example, when it is assumed that each of the transaction information TRINFO<1:N+M> has a 1 byte, five bits ($0^{th}$ bit to $4^{th}$ bit) may be allocated as the transaction ID information, one bit ($5^{th}$ bit) may be allocated as the commit information, one bit ($6^{th}$ bit) may be allocated as the abort information, and remaining one bit ($7^{th}$ bit) may be allocated as the start information.

Referring again to FIG. 5, The memory system 110 may include the controller 130 for controlling an operation of storing the write data WTDT<1:N+M> in the memory device 150 in response to the write commands WCMD<1:N+M> received from the host 102, and the memory device 150 for storing the write data WTDT<1:N+M> according to the control of the controller 130.

Herein, the memory device 150 may include the memory blocks 152 and 154, the memory blocks 152 and 154 may include pages P1<0:5> and P2<0:5>, respectively. Each of the pages P1<0:5> and P2<0:5> may include normal regions N1, N2, N3 and N4 and spare regions S1, S2, S3 and S4.

The controller 130 may store the write data WTDT<1:N+M> in the normal regions N1, N2, N3 and N4 of the memory device 150 in response to the write commands WCMD<1:N+M> received from the host 102. Also, the controller 130 may store the transaction information TRINFO<1:N+M> included in the write commands WCMD<1:N+M> in the spare regions S1, S2, S3 and S4 corresponding to the normal regions N1, N2, N3 and N4.

Specifically, the controller 130 may check the transaction information TRINFO<1:N+M> of the write commands WCMD<1:N+M> received from the host 102 in operation 1301.

As a result of check in operation 1301, the write commands WCMD<1:N> including the first transaction ID TID1 as the transaction ID information among the transaction information TRINFO<1:N+M> may be qualified as the first write commands 1st_WCMD<1:N> in operation 1302. Besides, as the result of check in operation 1301, the write commands WCMD<N+1:N+M> including the second transaction ID TID2 as the transaction ID information among the transaction information TRINFO<1:N+M> may be qualified as the second write commands 2nd_WCMD<1:M> in operation 1302.

As a result of operation 1302, the write data WTDT<1:N> corresponding to the first write commands 1st_WCMD<1:N> may be qualified as the first write data 1st_WTDT<1:N> in operation 1303. Besides, as the result of operation 1302, the write data WTDT<N+1:N+M> corresponding to the second write commands 2nd_WCMD<1:M> may be qualified as the second write data 2nd_WTDT<1:M> in operation 1303.

After operation 1302 and operation 1303, when the first write data 1st_WTDT<1:N> are stored in a first normal region of the memory device 150 in response to the first write commands 1st_WCMD<1:N>, the transaction information TRINFO<1:N> included in the first write commands 1st_WCMD<1:N> may be loaded and stored in a first spare region corresponding to the first normal region in operation 1304. Besides, after operation 1302 and operation 1303, when the second write data 2nd_WTDT<1:M> are stored in a second normal region of the memory device 150 in response to the second write commands 2nd_WCMD<1:M>, the transaction information TRINFO<N+1:N+M> included in the second write commands 2nd_WCMD<1:M> may be loaded and stored in a second spare region corresponding to the second normal region in operation 1304.

The first normal region where the first write data 1st_WTDT<1:N> are stored, the first spare region where the transaction information TRINFO<1:N> corresponding to the first write data 1st_WTDT<1:N> are stored, the second normal region where the second write data 2nd_WTDT<1:M> are stored, and the second spare region where the transaction information TRINFO<N+1:N+M> corresponding to the second write data 2nd_WTDT<1:M> are stored may be defined according to various embodiments as follows.

According to a first embodiment, a first data section N1 of any one, for example, a first page P10 of the first memory block 152, of the pages P1<0:5> and P2<0:5> included in the memory device 150 may be set to the first normal region. A first spare section S1 corresponding to the first data section N1 of the first page P10 may be set to the first spare region. A second data section N2 of the first page P10 may be set to the second normal region. A second spare section S2 corresponding to the second data section N2 of the first page P10 may be set to the second spare region.

According to another first embodiment, first and second data sections N1 and N2 of any one, for example, the first page P10 of the first memory block 152, of the pages P1<0:5> and P2<0:5> included in the memory device 150 may be set to the first normal region. First and second spare sections S1 and S2 corresponding to the first and second data sections N1 and N2 of the first page P10 may be set to the first spare region. Third and fourth data sections N3 and N4 of the first page P10 may be set to the second normal region. Third and fourth spare sections S3 and S4 corresponding to the third and fourth data sections N3 and N4 of the first page P10 may be set to the second spare region.

That is, according to the first embodiments, all of the first normal region, the second normal region, the first spare region and the second spare region may be included in any one of the pages P1<0:5> and P2<0:5> included in the memory device 150.

According to a second embodiment, data sections N1, N2, N3 and N4 of any one, for example, a first page P10 of the first memory block 152, of the pages P1<0:5> and P2<0:5> included in the memory device 150 may be set to the first normal region. Spare sections S1, S2, S3 and S4 of the first page P10 of the first memory block 152 may be set to the first spare region. Data sections N1, N2, N3 and N4 of a second page P11 of the first memory block 152 may be set to the second normal region. Spare sections S1, S2, S3 and S4 of the second page P11 of the first memory block 152 may be set to the second spare region.

According to another second embodiment, data sections N1, N2, N3 and N4 of any one, for example, the first page P10 of the first memory block 152, of the pages P1<0:5> and P2<0:5> included in the memory device 150 may be set to the first normal region. Spare sections S1, S2, S3 and S4 of the first page P10 of the first memory block 152 may be set to the first spare region. Data sections N1, N2, N3 and N4 of a first page P20 of the second memory block 154 may be set to the second normal region. Spare sections S1, S2, S3 and S4 of the first page P20 of the second memory block 154 may be set to the second spare region.

That is, according to the second embodiments, when the first normal region and the first spare region are included in any one of the pages P1<0:5> and P2<0:5> included in the memory device 150, the second normal region and the second spare region may be included in another page.

According to a third embodiment, data sections N1, N2, N3 and N4 of two or more pages, for example, first and second pages P10 and P11 of the first memory block 152, of the pages P1<0:5> and P2<0:5> included in the memory device 150 may be set to the first normal region. Spare sections S1, S2, S3 and S4 of the first and second pages P10 and P11 of the first memory block 152 may be set to the first spare region. Data sections N1, N2, N3 and N4 of third and fourth pages P12 and P13 of the first memory block 152 may be set to the second normal region. Spare sections S1, S2, S3 and S4 of the third and fourth pages P12 and P13 of the first memory block 152 may be set to the second spare region.

According to another third embodiment, data sections N1, N2, N3 and N4 of two or more pages, for example, the first and second pages P10 and P11 of the first memory block 152, of the pages P1<0:5> and P2<0:5> included in the memory device 150 may be set to the first normal region. Spare sections S1, S2, S3 and S4 of the first and second pages P10 and P11 of the first memory block 152 may be set to the first spare region. Data sections N1, N2, N3 and N4 of first and second pages P20 and P21 of the second memory block 154 may be set to the second normal region. Spare sections S1, S2, S3 and S4 of the first and second pages P20 and P21 of the second memory block 154 may be set to the second spare region.

That is, according to the third embodiments, when the first normal region and the first spare region are included in two or more pages of the pages P1<0:5> and P2<0:5> included in the memory device 150, the second normal region and the second spare region may be included in another two or more pages.

In the first to third embodiments, it is described that the first normal region and the second normal region have the same size all the time, and thus the first spare region and the second spare region also have the same size all the time. However, this is merely an example. For example, the first embodiments may be applied to the first normal region and the first spare region, the second embodiments may be applied to the second normal region and the second spare region.

Referring again to FIGS. 6B and 6C, the host 102 may generate the first write data 1st_WTDT<1:2> grouped into the first transaction and the first write commands 1st_W-CMD<1:2> including the transaction information TRINFO<1:2> including the first transaction ID TID1 to control an operation of storing the first write data 1st_WTDT<1:2> in the memory system 110, and transmit the first write data 1st_WTDT<1:2> and the first write commands 1st_WCMD<1:2> to the memory system 110.

In addition, the host 102 may generate the second write data 2nd_WTDT<1:3> grouped into the second transaction and the second write commands 2nd_WCMD<1:3> including transaction information TRINFO<3:5> including the second transaction ID TID2 to control an operation of storing the second write data 2nd_WTDT<1:3> in the memory system 110, and transmit the second write data 2nd_WTDT<1:3> and the second write commands 2nd_WCMD<1:3> to the memory system 110.

At this time, the first write commands 1st_WCMD<1:2> and the first write data 1st_WTDT<1:2> may be transmitted at a time point T1 and a time point T3 which are discontinuous with each other. The second write commands 2nd_WCMD<1:3> and the second write data 2nd_WTDT<1:3> may be transmitted at a time point T2, a time point T4 and a time point T5 which are discontinuous with each other.

In this manner, it may be seen that the first write commands 1st_WCMD<1:2> and first write data 1st_WTDT<1:2> and the second write commands 2nd_WCMD<1:3> and second write data 2nd_WTDT<1:3> are transmitted in the randomly mixed state from the host 102 to the memory system 110.

As a result of checkig that the transaction information TRINFO<1:2+3> included in the write commands WCMD<1:2+3> received from the host 102 at the time points T1 and T3 include the first transaction ID TID1, the memory system 110 may identify the write commands WCMD<1:2+3> received from the host 102 at the time points T1 and T3 as the first write commands 1st_W-CMD<1:2> and the write data WTDT<1:2+3> received from the host 102 at the time points T1 and T3 as the first write data 1st_WTDT<1:2> grouped into the first transaction.

Accordingly, the memory system 110 may store the first write data 1st_WTDT<1:2> in the first normal region included in the memory device 150 in response to the first write commands 1st_WCMD<1:2>, and may load the transaction information TRINFO<1:2> corresponding to the first write data 1st_WTDT<1:2> included in the first write commands 1st_WCMD<1:2> and store the transaction information TRINFO<1:2> in the first spare region included in the memory device 150. That is, the memory system 110 may store the first write data 1st_WTDT<1:2> in the first normal region, and then store the transaction information TRINFO<1:2> of the first write data 1st_WTDT<1:2> in the first spare region corresponding to the first normal region.

In addition, as a result of checking that the transaction information TRINFO<1:2+3> included in the write commands WCMD<1:2+3> received from the host 102 at the time points T2, T4 and T5 include the second transaction ID TID2, the memory system 110 may identify the write commands WCMD<1:2+3> received from the host 102 at the time points T2, T4 and T5 as the second write commands 2nd_WCMD<1:3> and the write data WTDT<1:2+3> received from the host 102 at the time points T2, T4 and T5 as the second write data 2nd_WTDT<1:3> grouped into the second transaction.

Accordingly, the memory system 110 may store the second write data 2nd_WTDT<1:3> in the second normal region included in the memory device 150 in response to the second write commands 2nd_WCMD<1:3>. Also, the memory system 110 may load the transaction information TRINFO<3:5> corresponding to the second write data 2nd_WTDT<1:3> included in the second write commands 2nd_WCMD<1:3> and store the transaction information TRINFO<3:5> in the second spare region included in the memory device 150. That is, the memory system 110 may store the second write data 2nd_WTDT<1:3> in the second normal region, and then store the transaction information TRINFO<3:5> of the second write data 2nd_WTDT<1:3> in the second spare region corresponding to the second normal region.

Herein, referring again to FIG. 6B, it may be seen that not only the first transaction ID TID1 as the transaction ID information but also the commit information CM and the abort information AB are included in the transaction information TRINFO<1:2> of the first write data 1st_WTDT<1:2>.

Accordingly, it may be seen whether the first write data 1st_WTDT<1:2> stored in the first normal region are in the commit state or in the abort state, through an operation of checking the transaction information TRINFO<1:2> of the first write data 1st_WTDT<1:2> stored in the first spare region.

For example, it may be seen that the first transaction ID TID1, the deactivated commit information CM_NO and the deactivated abort information AB_NO are included in the transaction information TRINFO<1> of the first write data 1st_WTDT<1> stored in the first spare region of the memory device 150, which is generated and transmitted from the host 102 at the time point T1. Also, it may be seen that the first transaction ID TID1, the activated commit information CM_YES and the deactivated abort information AB_NO are included in the transaction information TRINFO<1> of the first write data 1st_WTDT<2> stored in the first spare region of the memory device 150, which is generated and transmitted from the host 102 at the time point T3.

Accordingly, through the operation of checking the transaction information TRINFO<1:2> of the first write data 1st_WTDT<1:2> stored in the first spare region of the memory device 150, data stored in the first normal region may be identified as the first write data 1st_WTDT<1:2>, and simultaneously, it may be seen that the first write data 1st_WTDT<1:2> are placed in the commit state.

To sum up, since the host 102 includes not only the transaction ID information which is the first transaction ID TID1 but also the commit information and the abort information into the transaction information TRINFO<1:2> of the first write data 1st_WTDT<1:2>, and the memory system 110 stores the transaction information TRINFO<1:2> of the first write data 1st_WTDT<1:2> in the first spare region, it may be checked that the data stored in the first normal region are the first write data 1st_WTDT<1:2>. Simultaneously, it may be determined whether the first write data 1st_WTDT<1:2> are in the commit state or in the abort state, just through the operation of checking the first spare region.

It may be seen that not only the second transaction ID TID2 as the transaction ID information but also the commit information and the abort information are included in the transaction information TRINFO<3:5> of the second write data 2nd_WTDT<1:3>.

Accordingly, it may be seen whether the second write data 2nd_WTDT<1:3> stored in the second normal region are in the commit state or in the abort state, through an operation of checking the transaction information TRINFO<3:5> of the second write data 2nd_WTDT<1:3> stored in the second spare region.

For example, it may be seen that the second transaction ID TID2, the deactivated commit information CM_NO and the deactivated abort information AB_NO are included in the transaction information TRINFO<3> of the second write data 2nd_WTDT<1> stored in the second spare region of the memory device 150, which is generated and received from the host 102 at the time point T2. Also, it may be seen that the second transaction ID TID2, the deactivated commit information CM_NO and the deactivated abort information AB_NO are included in the transaction information TRINFO<4> of the second write data 2nd_WTDT<2> stored in the second spare region of the memory device 150, which is generated and received from the host 102 at the time point T4. Also, it may be seen that the second transaction ID TID2, the activated commit information CM_YES and the deactivated abort information AB_NO are included in the transaction information TRINFO<5> of the second write data 2nd_WTDT<3> stored in the second spare region of the memory device 150, which is generated and received from the host 102 at the time point T5.

Accordingly, through the operation of checking the transaction information TRINFO<3:5> of the second write data 2nd_WTDT<1:3> stored in the second spare region of the memory device 150, data stored in the second normal region may be identified as the second write data 2nd_WTDT<1:3>. Simultaneously, it may be seen that the second write data 2nd_WTDT<1:3> are placed in the commit state.

To sum up, since the host 102 includes not only the transaction ID information which is the second transaction ID TID2 but also the commit information and the abort information into the transaction information TRINFO<3:5> of the second write data 2nd_WTDT<1:3>, and the memory system 110 stores the transaction information TRINFO<3:5> of the second write data 2nd_WTDT<1:3> in the second spare region, it may be checked that the data stored in the second normal region are the second write data 2nd_WTDT<1:3>. Simultaneously, it may be determined whether the second write data 2nd_WTDT<1:3> are in the commit state or in the abort state, just through the operation of checking the second spare region.

Since the memory system 110 described with reference to FIG. 6B may determine whether or not the first write data 1st_WTDT<1:2> stored in the first normal region are in the commit state through the operation of checking the first spare region and determine whether or not the second write data 2nd_WTDT<1:3> stored in the second normal region are in the commit state through the operation of checking the second spare region, the host 102, as described earlier with reference to FIG. 6A, may not need to generate and transmit the first commit command 1st_COMMIT and the second commit command 2nd_COMMIT for indicating that the transmission of first write data 1st_WTDT<1:2> is completed to the memory system 110.

Referring again to FIG. 6C, it may be seen that not only the first transaction ID TID1 as the transaction ID information but also the start information ST, the commit information CM and the abort information AB are included in the transaction information TRINFO<1:2> of the first write data 1st_WTDT<1:2>.

Accordingly, it may be seen whether or not start data of the transaction is included in the first write data 1st_WTDT<1:2> stored in the first normal region and simultaneously whether or not the first write data 1st_WTDT<1:2> are in the commit state or in the abort state, through an operation of checking the transaction information TRINFO<1:2> of the first write data 1st_WTDT<1:2> stored in the first spare region.

For example, it may be seen that the first transaction ID TID1, the activated start information ST_YES, the deactivated commit information CM_NO and the deactivated abort information AB_NO are included in the transaction information TRINFO<1> of the first write data 1st_WTDT<1> stored in the first spare region of the memory device 150, which is generated and received from the host 102 at a time point T1. Also, it may be seen that the first transaction ID TID1, the deactivated start information ST_NO, the activated commit information CM_YES and the deactivated abort information AB_NO are included in the transaction information TRINFO<2> of the first write data 1st_WTDT<2> stored in the first spare region of the memory device 150, which is generated and received from the host 102 at a time point T3.

Accordingly, through the operation of checking the transaction information TRINFO<1:2> of the first write data 1st_WTDT<1:2> stored in the first spare region of the memory device 150, data stored in the first normal region may be identified as the first write data 1st_WTDT<1:2>. Simultaneously, it may be seen that the first write data 1st_WTDT<1> is the start data and the first write data 1st_WTDT<1:2> are placed in the commit state.

To sum up, the host 102 may include not only the transaction ID information which is the first transaction ID TID1 but also the start information ST, the commit information CM and the abort information AB into the transaction information TRINFO<1:2> of the first write data 1st_WTDT<1:2>, and the memory system 110 may store the transaction information TRINFO<1:2> of the first write data 1st_WTDT<1:2> in the first spare region. Thus, it may be checked that the data stored in the first normal region are the first write data 1st_WTDT<1:2>, and it may be determined whether or not the start data of the transaction is included in the first write data 1st_WTDT<1:2>, and simultaneously whether the first write data 1st_WTDT<1:2> are in the commit state or in the abort state, just through the operation of checking the first spare region.

An advantage of the operation of checking whether or not the start data is included in the first write data 1st_WTDT<1:2> is that a start moment of the first transaction may be clearly distinguished. That is, if the start data of each transaction is clearly distinguished when a plurality of transactions are transmitted in a mixed state from the host 102 to the memory system 110, an operation of distinguishing each of the plurality of transactions in the memory system 110 may be more simple.

In addition, it may be seen that not only the second transaction ID TID2 as the transaction ID information but also the start information, the commit information and the abort information are included in the transaction information TRINFO<3:5> of the second write data 2nd_WTDT<1:3>.

Accordingly, it may be seen whether or not start data of the transaction is included in the second write data 2nd_WTDT<1:3> stored in the second normal region and simultaneously whether or not the second write data 2nd_WTDT<1:3> are in the commit state or in the abort state, through an operation of checking the transaction information TRINFO<3:5> of the second write data 2nd_WTDT<1:3> stored in the second spare region.

For example, it may be seen that the second transaction ID TID2, the activated start information ST_YES, the deactivated commit information CM_NO and the deactivated abort information AB_NO are included in the transaction information TRINFO<3> of the second write data 2nd_WTDT<1> stored in the second spare region of the memory device 150, which is generated and received from the host 102 at a time point T2. Also, it may be seen that the second transaction ID TID2, the deactivated start information ST_NO, the activated commit information CM_YES and the deactivated abort information AB_NO are included in the transaction information TRINFO<4> of the second write data 2nd_WTDT<2> stored in the second spare region of the memory device 150, which is generated and received from the host 102 at a time point T4. Besides, it may be seen that the second transaction ID TID2, the deactivated start information ST_NO, the activated commit information CM_YES and the deactivated abort information AB_NO are included in the transaction information TRINFO<5> of the second write data 2nd_WTDT<3> stored in the second spare region of the memory device 150, which is generated and received from the host 102 at a time point T5.

Accordingly, through the operation of checking the transaction information TRINFO<3:5> of the second write data 2nd_WTDT<1:3> stored in the second spare region of the memory device 150, data stored in the second normal region may be identified as the second write data 2nd_WTDT<1:3>. Simultaneously, it may be seen that the second write data 2nd_WTDT<1> is the start data and the second write data 2nd_WTDT<1:3> are placed in the commit state.

To sum up, the host 102 may include not only the transaction ID information which is the second transaction ID TID2 but also the start information, the commit information and the abort information into the transaction information TRINFO<3:5> of the second write data 2nd_WTDT<1:3>, and the memory system 110 may store the transaction information TRINFO<3:5> of the second write data 2nd_WTDT<1:3> in the second spare region. Thus, it may be checked that the data stored in the second normal region are the second write data 2nd_WTDT<1:3>, and it may be determined whether or not the start data of the transaction is included in the second write data 2nd_WTDT<1:3>, and simultaneously whether the second write data 2nd_WTDT<1:3> are in the commit state or in the abort state, just through the operation of checking the second spare region.

An advantage of the operation of checking whether or not the start data is included in the second write data 2nd_WTDT<1:3> is that a start time point of the second transaction may be clearly distinguished. That is, if the start data of each transaction is clearly distinguished when a plurality of transactions are transmitted in a mixed state from the host 102 to the memory system 110, an operation of distinguishing each of the plurality of transactions in the memory system 110 may be more simple.

Since the memory system 110 described with reference to FIG. 6C may determine whether or not the first write data 1st_WTDT<1:2> stored in the first normal region are in the commit state through the operation of checking the first spare region and determine whether or not the second write data 2nd_WTDT<1:3> stored in the second normal region are in the commit state through the operation of checking the second spare region, the host 102, as described earlier with reference to FIG. 6A, may not need to generate and transmit the first commit command 1st_COMMIT and the second commit command 2nd_COMMIT for indicating that the transmission of first write data 1st_WTDT<1:2> is completed to the memory system 110.

Figure 8:
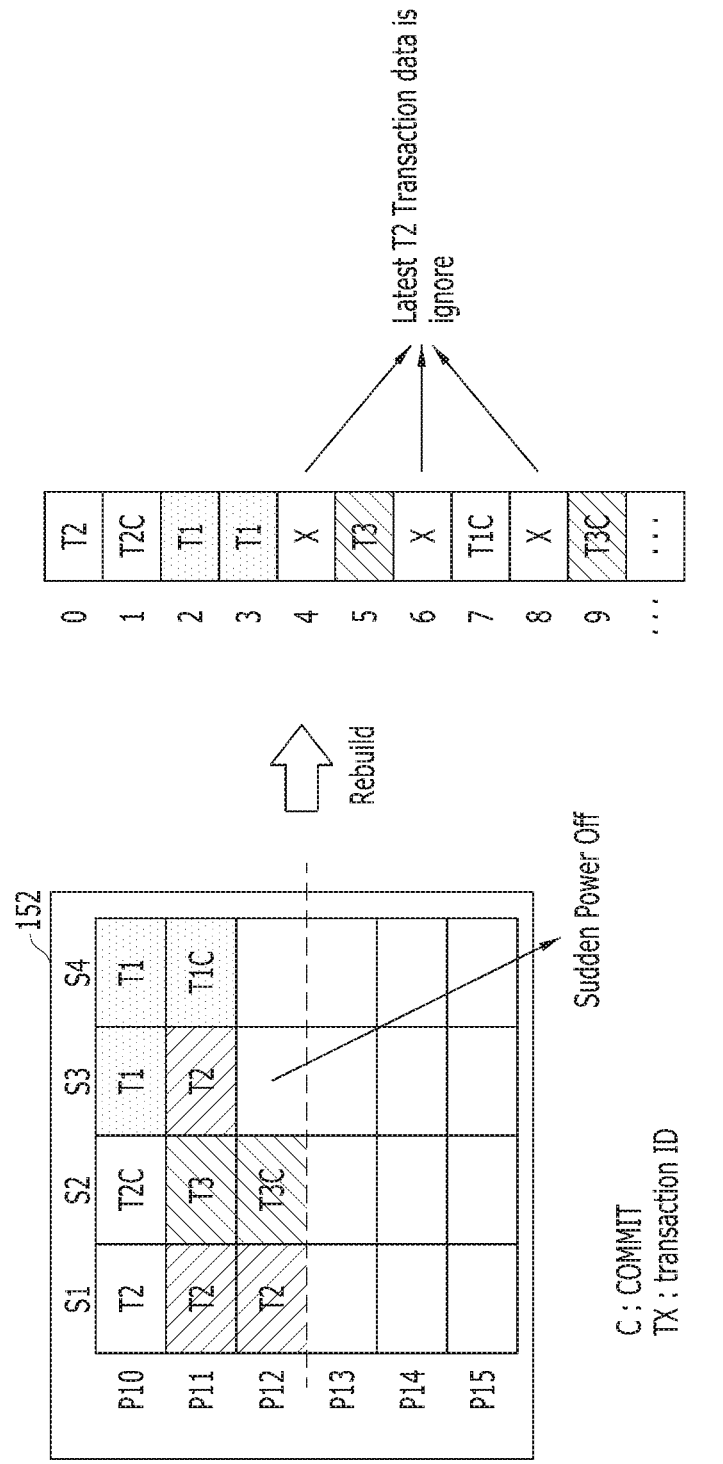
FIG. 8 is a diagram illustrating an operation of rebuilding a plurality of write data grouped into transactions after a sudden power-off (SPO) occurs in a data processing system in accordance with an embodiment of the present invention.

FIG. 8 is a diagram illustrating an operation of rebuilding a plurality of write data grouped into transactions after sudden power-off (SPO) occurs in a data processing system shown in FIG. 5.

FIG. 8 does not illustrate the normal regions N1, N2, N3 and N4 of the first memory block 152 of the memory device 150 of the memory system 110 included in the data processing system 100 shown in FIG. 5 but illustrates just the spare regions S1, S2, S3 and S4. In addition, FIG. 8 shows that an operation of rebuilding the write data grouped into transactions after sudden power-off (SPO) occurs is included in the data processing system 100.

Referring to FIG. 8, when rebuilding the write data WTDT<1:N+M> during a booting period where a power source is supplied again after the SPO occurs while the write data WTDT<1:N+M> are stored in the memory device 150, the memory system 110 may read and check the transaction information TRINFO<1:N+M> of the write data WTDT<1:N+M> stored in the spare regions S1, S2, S3 and S4 of the memory device 150.

As described above with reference to FIGS. 6B and 7A, it is assumed that the transaction ID information, the commit information and the abort information are included in the transaction information TRINFO<1:N+M> as a result of the check. When transaction information TR_INFO1<1:N> and TR_INFO2<1:M> including the activated commit information CM_YES are retrieved, the write data 1st_WTDT<1:N> and 2nd_WTDT<1:M> stored in the normal regions N1, N2, N3 and N4, which correspond to the transaction information TR_INFO1<1:N> and TR_INFO2<1:M>, may be determined as a normal state and rebuilt.

As described above with reference to FIGS. 6B and 7A, it is assumed that the transaction ID information, the commit information and the abort information are included in the transaction information TRINFO<1:N+M> as the result of the check. When the transaction information TR_INFO1<1:N> and TR_INFO2<1:M> including the activated commit information CM_YES are not retrieved or the transaction information TR_INFO1<1:N> and TR_INFO2<1:M> including the activated abort information AB_YES are retrieved, the write data 1st_WTDT<1:N> and 2nd_WTDT<1:M> stored in the normal regions N1, N2, N3 and N4, which correspond to the transaction information TR_INFO1<1:N> and TR_INFO2<1:M>, may be determined as an abnormal state and may not be rebuilt.

As described above with reference to FIGS. 6C and 7B, it is assumed that the transaction ID information, the start information, the commit information and the abort information are included in the transaction information TRINFO<1:N+M> as the result of the check. When the transaction information TR_INFO1<1:N> and TR_INFO2<1:M> including the activated commit information CM_YES and the transaction information TR_INFO1<1:N> and TR_INFO2<1:M> including the activated start information SY_YES are retrieved, the write data 1st_WTDT<1:N> and 2nd_WTDT<1:M> stored in the normal regions N1, N2, N3 and N4, which correspond to the transaction information TR_INFO1<1:N> and TR_INFO2<1:M>, may be determined as a normal state and rebuilt.

As described above with reference to FIGS. 6C and 7B, it is assumed that the transaction ID information, the start information, the commit information and the abort information are included in the transaction information TRINFO<1: N+M> as the result of the check. When any one transaction information TR_INFO1<1:N> and TR_INFO2<1:M> of the transaction information TR_INFO1<1:N> and TR_INFO2<1:M> including the activated start information ST_YES and the transaction information TR_INFO1<1:N> and TR_INFO2<1:M> including the activated commit information CM_YES are not retrieved, the write data 1st_WTDT<1:N> and 2nd_WTDT<1:M> stored in the normal regions N1, N2, N3 and N4, which correspond to the transaction information TR_INFO1<1:N> and TR_INFO2<1:M>, may be determined as an abnormal state and may not be rebuilt.

Referring again to FIG. 8 in order to describe as an example, various pieces of transaction information T2, T2C, T1, T1, T2, T3, T2, T1C, T2, T3C may be stored in the spare regions S1, S2, S3 and S4 of the first memory block 152 of the memory device 150.

"Tx" of the transaction information T2, T2C, T1, T1, T2, T3, T2, T1C, T2, T3C represents the transaction ID information. In other words, T2 represents a second transaction ID, T1 represents a first transaction ID, and T3 represents a third transaction ID. "C" following "Tx" represents that the commit information is included in the transaction information on "Tx" in an activated state (CM_YES). Although not directly illustrated, "A" instead of "C" may be followed by "Tx", which represents that the abort information is included in the transaction information on "Tx" in an activated state (AB_YES). Accordingly, a case where both "C" and "A" are not followed by "Tx" represents that the commit information and the abort information are included in the transaction information on "Tx" in a deactivated state (CM_NO, AB_NO).

Specifically, "T2" may be stored in the first spare section S1 of the first page P10 of the first memory block 152 of the memory device 150, "T2C" may be stored in the second spare section S2, "T1" may be stored in the third spare section S3, and "T1" may be stored in the fourth spare section S4.

Also, "T2" may be stored in the first spare section S1 of the second page P11 of the first memory block 152 of the memory device 150, "T3" may be stored in the second spare section S2, "T2" may be stored in the third spare section S3, and "T1C" may be stored in the fourth spare section S4.

Also, "T2" may be stored in the first spare section S1 of the third page P12 of the first memory block 152 of the memory device 150, "T3C" may be stored in the second spare section S2, and it may be assumed that the SPO occurs in a process of storing the transaction information in the third spare section S3.

The memory system 110 may sequentially read and check the spare regions S1, S2, S3 and S4 of the first memory block 152 of the memory device 150 during a rebuilding operation after the SPO occurs.

According to a read order of the spare regions S1, S2, S3 and S4 of the first memory block 152, the memory system 110 may sequentially check the transaction information "T2, T2C, T1, T1" stored in the spare regions S1, S2, S3 and S4 of the first page P10. Subsequently, the memory system 110 may sequentially check the transaction information "T2, T3, T2, T1C" stored in the spare regions S1, S2, S3 and S4 of the second page P11. Subsequently, the memory system 110 may sequentially check the transaction information "T2, T3C" stored until the SPO occurs in the spare regions S1, S2, S3 and S4 of the third page P12.

The memory system 110 may identify the transaction information "T2" and "T2C" stored respectively in the first spare section S1 and second spare section S2 of the first page P10 as the transaction information corresponding to the second transaction in order. Since both of "T2" and "T2C" exist, the memory system 110 may determine that the activated commit information CM_YES is retrieved for the second transaction. Therefore, the memory system 110 may determine that all data (not illustrated) grouped into the second transaction, which are stored in the first normal section N1 and second normal section N2 of the first page P10 corresponding to the first spare section S1 and second spare section S2 of the first page P10, respectively, are in the normal state, and may rebuild the data.

Subsequently, the memory system 110 may identify the transaction information "T1", "T1" and "T1C" stored respectively in the third spare section S3 and fourth spare section S4 of the first page P10 and in the fourth spare section S4 of the second page P11 as the transaction information corresponding to the first transaction in order. Since both of "T1" and "T1C" exist, the memory system 110 may determine that the activated commit information CM_YES is retrieved for the first transaction. Therefore, the memory system 110 may determine that all data (not illustrated) grouped into the first transaction, which are stored in the third normal section N3 and fourth normal section N4 of the first page P10 and in the fourth normal section N4 of the second page P11 corresponding to the third spare section S3 and fourth spare section S4 of the first page P10 and the fourth spare section S4 of the second page P11, are in the normal state, and may rebuild the data.

Subsequently, the memory system 110 may identify the transaction information "T3" and "T3C" stored respectively in the second spare section S2 of the second page P11 and in the second spare section S2 of the third page P12 as the transaction information corresponding to the third transaction in order. Since both of "T3" and "T3C" exist, the memory system 110 may determine that the activated commit information CM_YES is retrieved for the third transaction. Therefore, the memory system 110 may determine that all data (not illustrated) grouped into the third transaction, which are stored in the second normal section N2 of the second page P11 and the second normal section N2 of the third page P12 corresponding to the second spare section S2 of the second page P11 and the second spare section S2 of the third page P12, are in the normal state, and may rebuild the data.

Subsequently, the memory system 110 may identify the transaction information "T2", "T2" and "T2" stored respectively in the first spare section S1 and third spare section S3 of the second page P11 and in the first spare section S1 of the third page P12 as the transaction information corresponding to the second transaction. Since only "T2" exists, and "T2C" does not exist, the memory system 110 may determine that the activated commit information CM_YES is not retrieved for the second transaction. Therefore, the memory system 110 may determine that all data (not illustrated) grouped into the second transaction, which are stored in the first normal section N1 and third normal section N3 of the second page P11 and in the first normal section N1 of the third page P12 corresponding to the first spare section S1 and third spare section S3 of the second page P11 and in the first spare section S1 of the third page P12, are in the abnormal state, and may not rebuild the data.

FIGS. 9 to 17 are diagrams schematically illustrating application examples of the data processing system of FIGS. 1 to 8 according to various embodiments.

Figure 9:
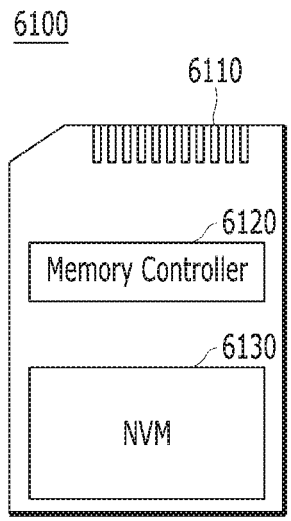
FIGS. 9 to 17 are diagrams schematically illustrating application examples of a data processing system, in accordance with various embodiments of the present invention.

FIG. 9 is a diagram schematically illustrating an example of the data processing system including the memory system in accordance with an embodiment. FIG. 9 schematically illustrates a memory card system to which the memory system in accordance with an embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
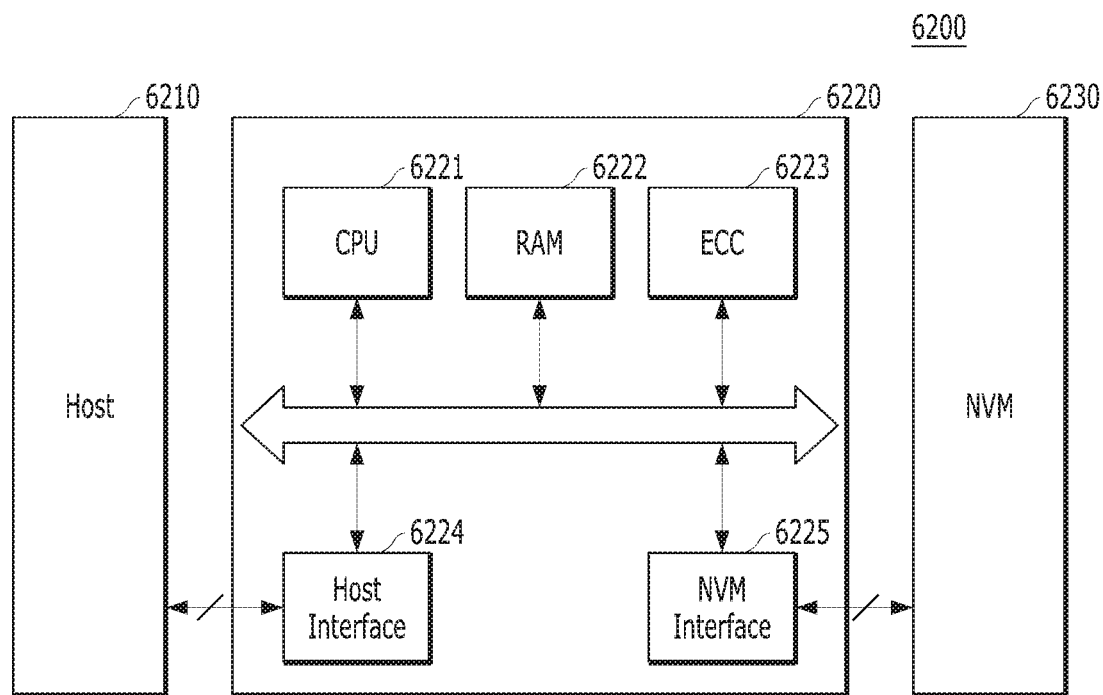

FIG. 10 is a diagram schematically illustrating another example of the data processing system including a memory system, in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 8, and the memory controller 6220 may correspond to the controller 130 in the memory system 110 described in FIGS. 1 to 8.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations for the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. In this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe, or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 11:
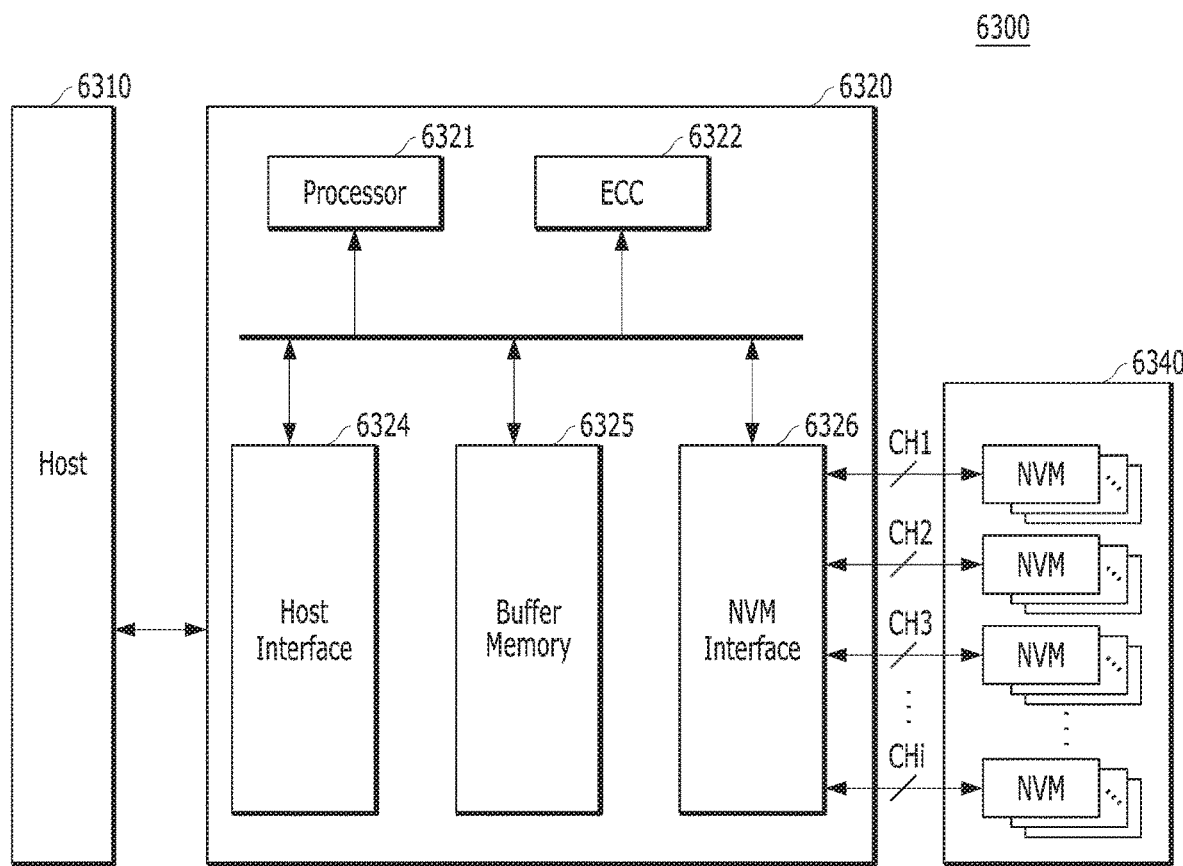

FIG. 11 is a diagram schematically illustrating another example of the data processing system including the memory system in accordance with an embodiment. FIG. 11 schematically illustrates an SSD to which the memory system in accordance with an embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. In this case, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
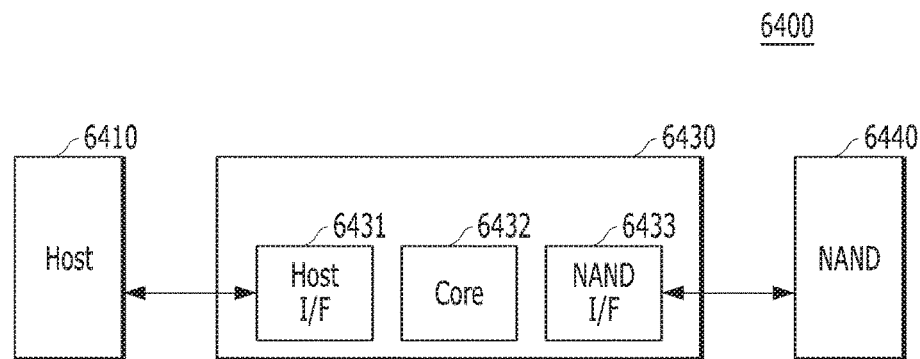
Figure 13:
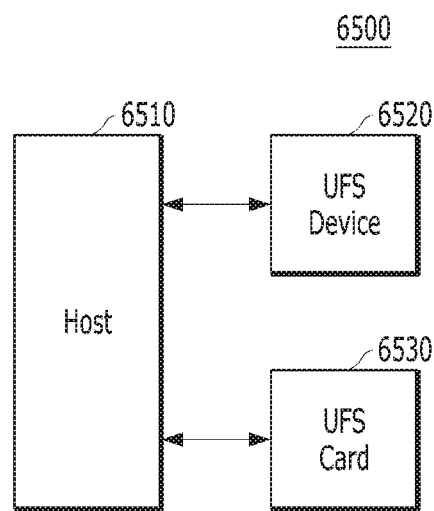
Figure 14:
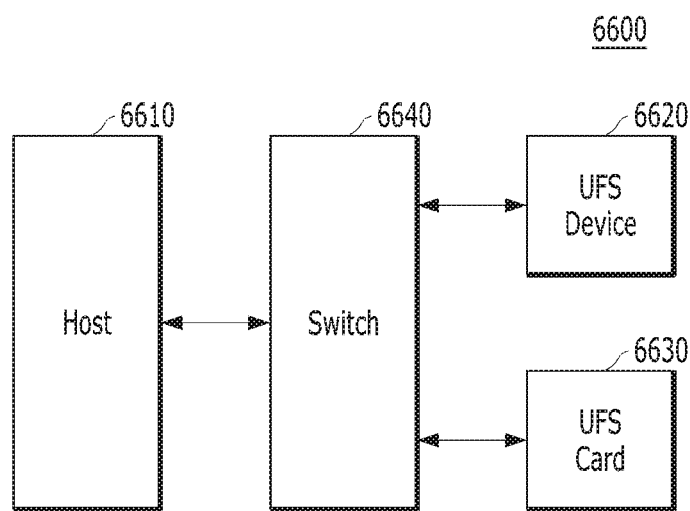
Figure 15:
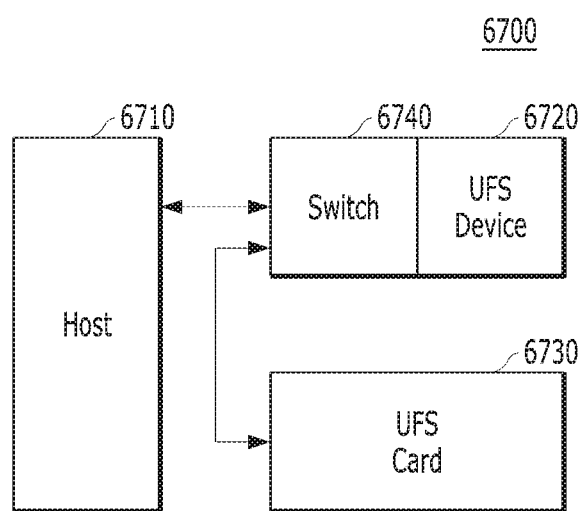
Figure 16:
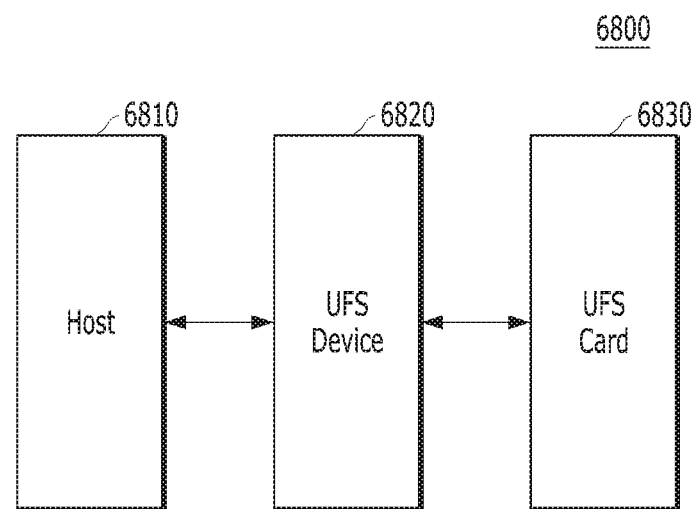

FIG. 12 is a diagram schematically illustrating another example of the data processing system including the memory system in accordance with an embodiment. FIG. 12 schematically illustrates an embedded Multi-Media Card (eMMC) to which the memory system in accordance with an embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with an embodiment. FIGS. 13 to 16 schematically illustrate UFS (Universal Flash Storage) systems to which the memory system in accordance with an embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 17:
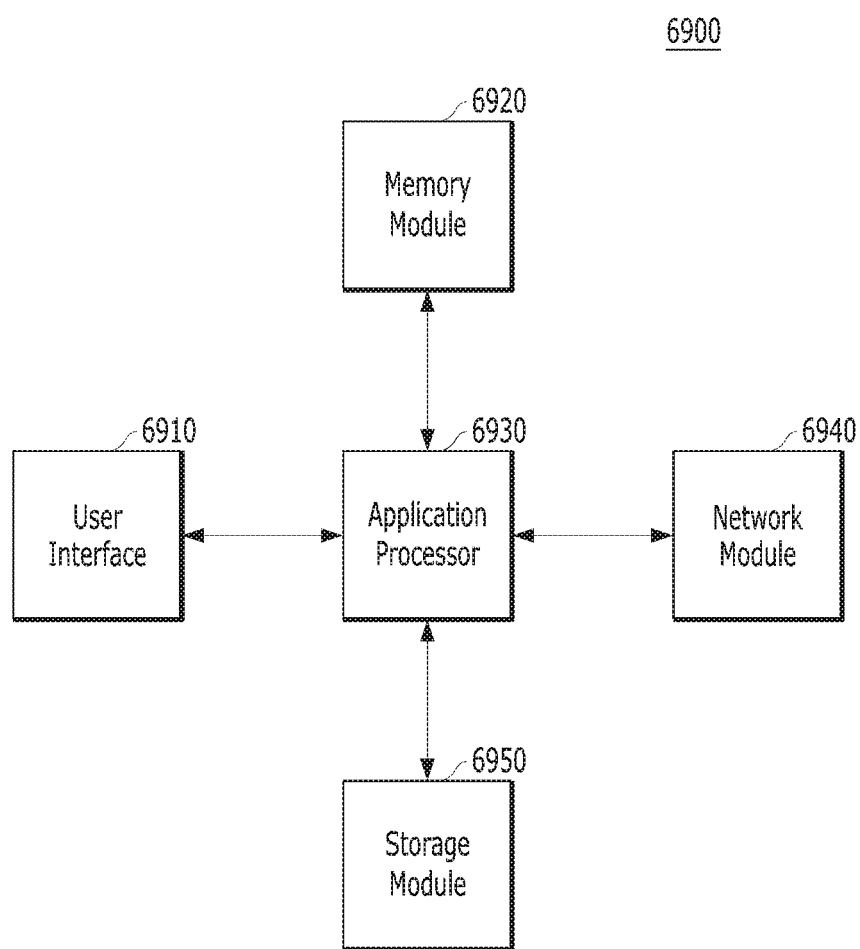

FIG. 17 is a diagram schematically illustrating another example of the data processing system including the memory system in accordance with an embodiment. FIG. 17 is a diagram schematically illustrating a user system to which the memory system in accordance with an embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. A data processing system, comprising:
   a host suitable for generating a plurality of write data grouped into transactions and a plurality of write commands including transaction information of each of the write data; and
   a memory system suitable for storing the write data in a normal region of a memory device in response to the write commands received from the host, and storing the transaction information included in each of the write commands in a spare region, which corresponds to the normal region, of the memory device,
   wherein the transaction information includes transaction ID information, commit information, and abort information,
   wherein the host generates transaction information of last data among the write data including activated commit information and deactivated abort information for validating the write data,
   wherein the host generates the transaction information of the last data including deactivated commit information and activated abort information for invalidating the write data, and
   wherein the host generates transaction information of each of remaining intermediate data except for the last data among the write data including deactivated commit information and deactivated abort information.

2. The data processing system of claim 1, wherein the host generates transaction information of each of first write data grouped into a first transaction including first ID information and commit information, and
   as a result of checking the transaction information of each of the write commands received from the host, the memory system identifies the write commands including the first ID information as first write commands, and identifies the write data corresponding to the first write commands as the first write data, and
   when the first write data are stored in a first normal region in response to the first write commands, the memory system loads and stores transaction information included in the first write commands in a first spare region corresponding to the first normal region.

3. The data processing system of claim 2, wherein the host generates transaction information of each of second write data grouped into a second transaction including second ID information and commit information, and as a result of checking the transaction information of each of the write commands received from the host, the memory system identifies the write commands including the second ID information as second write commands, and identifies the write data corresponding to the second write commands as the second write data, and when the second write data are stored in a second normal region in response to the second write commands, the memory system loads and stores transaction information included in the second write commands in a second spare region corresponding to the second normal region.

4. The data processing system of claim 3, wherein the memory device includes a plurality of pages, the first normal region includes a first data section of a first page among the pages, the second normal region includes a second data section of the first page, the first spare region includes a first spare section of the first page, and the second spare region includes a second spare section of the first page.

5. The data processing system of claim 3, wherein the memory device includes a plurality of pages, the first normal region includes a data section of a first page among the pages, the second normal region includes a data section of a second page among the pages, the first spare region includes a spare section of the first page, and the second spare region includes a spare section of the second page.

6. The data processing system of claim 3, wherein the memory device includes a plurality of pages, the first normal region includes a data section of a first page group including at least two pages among the pages, the second normal region includes a data section of a second page group including at least two pages among the pages, the first spare region includes a spare section of the first page group, and the second spare region includes a spare section of the second page group.

7. The data processing system of claim 1, wherein as a result of reading and checking the transaction information of the write data stored in the spare region when rebuilding the write data during a booting period where a power source is supplied again after sudden power-off (SPO) occurs while storing the write data in the memory device, when transaction information including activated commit information is retrieved, the memory system determines the write data stored in the normal region as being in a normal state and rebuilds the write data, and when transaction information including activated commit information is not retrieved or transaction information including activated abort information is retrieved, the memory system determines the write data stored in the normal region as being in an abnormal state and does not rebuild the write data.

8. The data processing system of claim 1, wherein the transaction information of each of the write data further includes start information, and the host generates transaction information of start data among the intermediate data including deactivated commit information, deactivated abort information and activated start information.

9. The data processing system of claim 8, wherein as a result of reading and checking the transaction information of the write data stored in the spare region when rebuilding the write data during a booting period where a power source is supplied again after sudden power-off (SPO) occurs while storing the write data in the memory device, when transaction information including activated commit information and transaction information including activated start information are retrieved, the memory system determines the write data stored in the normal region as being in a normal state and rebuilds the write data, and when either transaction information including activated start information or transaction information including activated commit information is not retrieved, the memory system determines the write data stored in the normal region as being in an abnormal state and does not rebuild the write data.

10. An operating method of a data processing system including a host suitable for generating a plurality of write data grouped into transactions and a plurality of write commands, and a memory system suitable for storing the write data in a memory device in response to the write commands received from the host, comprising:

generating, by the host, the write commands including transaction information of each of the write data; and storing, by the memory system, the write data in a normal region of the memory device and the transaction information included in each of the write commands in a spare region, which corresponds to the normal region, of the memory device, wherein the transaction information includes transaction ID information, commit information, and abort information, wherein the generating of the write commands of the transaction information of each of the write data includes:

generating transaction information of last data among the write data including activated commit information and deactivated abort information into transaction information of last data among the write data for validating the write data, generating the transaction information of the last data including deactivated commit information and activated abort information for invalidating the write data, and generating transaction information of each of remaining intermediate data except for the last data among the write data including deactivated commit information and deactivated abort information.

11. The operating method of claim 10, wherein first ID information, commit information and abort information are included in transaction information of each of first write data grouped into a first transaction, and wherein the storing of the write data in the normal region and the transaction information in the spare region of the memory device includes:

identifying the write commands including the first ID information as first write commands and the write data corresponding to the first write commands as the first write data as a result of checking the transaction information of each of the write commands received from the host; and loading and storing transaction information included in the first write commands in a first spare region corresponding to a first normal region when the first write data are stored in the first normal region in response to the first write commands.

12. The operating method of claim 11, wherein second ID information, start information and commit information are included in transaction information of each of second write data grouped into a second transaction, and wherein the storing of the write data in the normal region and the transaction information in the spare region of the memory device further includes:

identifying the write commands including the second ID information as second write commands and the write data corresponding to the second write commands as the second write data as a result of checking the transaction information of each of the write commands received from the host; and loading and storing transaction information included in the second write commands in a second spare region corresponding to a second normal region when the second write data are stored in the second normal region in response to the second write commands.

13. The operating method of claim 12, wherein the memory device includes a plurality of pages, the first normal region includes a first data section of a first page among the pages, the second normal region includes a second data section of the first page, the first spare region includes a first spare section of the first page, and the second spare region includes a second spare section of the first page.

14. The operating method of claim 12, wherein the memory device includes a plurality of pages, the first normal region includes a data section of a first page among the pages, the second normal region includes a data section of a second page among the pages, the first spare region includes a spare section of the first page, and the second spare region includes a spare section of the second page.

15. The operating method of claim 12, wherein the memory device includes a plurality of pages, the first normal region includes a data section of a first page group including two or more pages among the pages, the second normal region includes a data section of a second page group including two or more pages among the pages, the first spare region includes a spare section of the first page group, and the second spare region includes a spare section of the second page group.

16. The operating method of claim 10, further including:

reading and checking the transaction information of the write data stored in the spare region when rebuilding the write data during a booting period where a power source is supplied again after sudden power-off (SPO) occurs while the memory system stores the write data in the memory device;

determining the write data stored in the normal region as being in a normal state and rebuilding the write data when transaction information including activated commit information is retrieved as a result of the reading and checking of the transaction information; and determining the write data stored in the normal region as being in an abnormal state and not rebuilding the write data when transaction information including activated commit information is not retrieved or transaction information including activated abort information is retrieved as a result of the reading and checking of the transaction information.

* * * * *